United States Patent
Sakai et al.

(10) Patent No.: US 10,361,816 B2
(45) Date of Patent: Jul. 23, 2019

(54) COMMUNICATION APPARATUS AND COMMUNICATION METHOD

(71) Applicant: SONY CORPORATION, Tokyo (JP)

(72) Inventors: Eisuke Sakai, Tokyo (JP); Tomoya Yamaura, Tokyo (JP); Masanori Sato, Tokyo (JP); Takeshi Itagaki, Saitama (JP); Yuichi Morioka, Weybridge (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/510,804

(22) PCT Filed: Oct. 16, 2015

(86) PCT No.: PCT/JP2015/005232
§ 371 (c)(1),
(2) Date: Mar. 13, 2017

(87) PCT Pub. No.: WO2016/067546
PCT Pub. Date: May 6, 2016

(65) Prior Publication Data
US 2017/0250784 A1    Aug. 31, 2017

(30) Foreign Application Priority Data

Oct. 27, 2014  (JP) .................................. 2014-218185

(51) Int. Cl.
| | | |
|---|---|---|
| *H04L 1/00* | (2006.01) | |
| *H04L 1/08* | (2006.01) | |
| *H04L 1/16* | (2006.01) | |
| *H04L 29/08* | (2006.01) | |

(52) U.S. Cl.
CPC .......... *H04L 1/0067* (2013.01); *H04L 1/0057* (2013.01); *H04L 1/08* (2013.01); *H04L 1/1685* (2013.01); *H04L 69/324* (2013.01)

(58) Field of Classification Search
None
See application file for complete search history.

(56) References Cited

U.S. PATENT DOCUMENTS

2007/0277079 A1*  11/2007  Hofmann ............... H04H 20/28
                                                    714/758
2007/0286149 A1    12/2007  Yamamoto et al.
(Continued)

FOREIGN PATENT DOCUMENTS

| JP | 2009-164751 A | 7/2009 |
| JP | 2010-263490 A | 11/2010 |

(Continued)

OTHER PUBLICATIONS

International Search Report dated Jan. 8, 2016 in PCT/JP2015/005232 filed Oct. 16, 2015.

(Continued)

*Primary Examiner* — Mujtaba M Chaudry
(74) *Attorney, Agent, or Firm* — XSENSUS LLP

(57) ABSTRACT

A communication apparatus includes circuitry configured to perform a process on a frame so that the frame has redundancy corresponding to first information indicating at least one of a first transmission period or a band used for transmission, or uses a modulation scheme corresponding to the first information.

18 Claims, 14 Drawing Sheets

(56) References Cited

U.S. PATENT DOCUMENTS

| | | | |
|---|---|---|---|
| 2008/0028276 A1* | 1/2008 | Li | H04L 65/608 714/752 |
| 2008/0232357 A1* | 9/2008 | Chen | H03M 13/1102 370/389 |
| 2008/0270124 A1* | 10/2008 | Son | G10L 19/025 704/205 |
| 2009/0125778 A1* | 5/2009 | Uchida | H04L 1/0057 714/749 |
| 2009/0268790 A1 | 10/2009 | Josiam et al. | |
| 2010/0077276 A1* | 3/2010 | Okamura | H03M 13/1102 714/752 |
| 2010/0118825 A1* | 5/2010 | Kawamura | H04L 5/0007 370/330 |
| 2010/0218066 A1* | 8/2010 | Okamura | H03M 13/1105 714/752 |
| 2012/0044904 A1 | 2/2012 | Takano et al. | |
| 2012/0099659 A1* | 4/2012 | Lin | H04H 20/30 375/240.26 |
| 2012/0213234 A1* | 8/2012 | Zhang | H04W 28/06 370/474 |
| 2013/0272357 A1* | 10/2013 | Shulman | H04L 5/14 375/222 |
| 2014/0025837 A1* | 1/2014 | Swenson | H04L 29/06027 709/231 |

FOREIGN PATENT DOCUMENTS

| | | |
|---|---|---|
| JP | 2010-263493 A | 11/2010 |
| WO | WO 2011/010433 A1 | 1/2011 |
| WO | WO 2014/014094 A1 | 1/2014 |

OTHER PUBLICATIONS

Office Action dated Nov. 14, 2017 in corresponding Japanese Patent Application No. 2014-218185 (with English Translation), 16 pages.

\* cited by examiner

[Fig. 1]
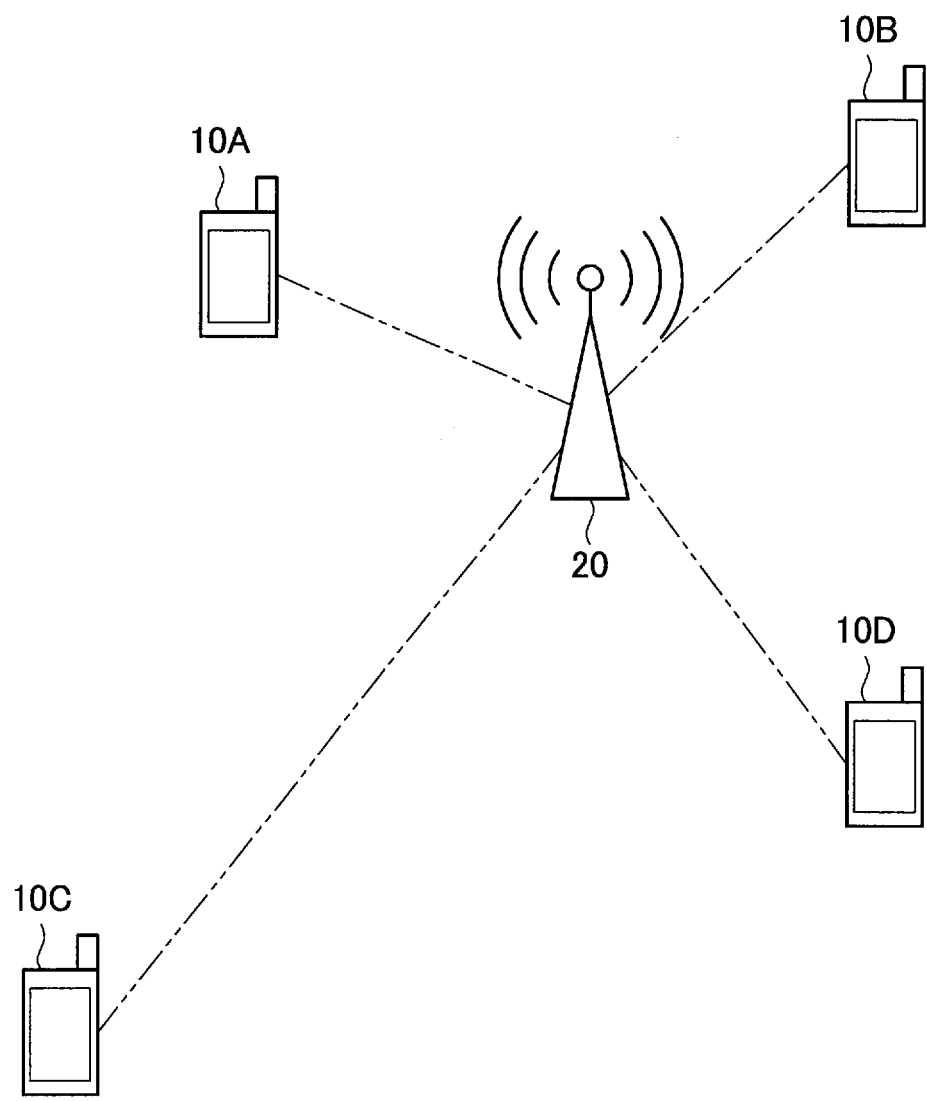

[Fig. 2]
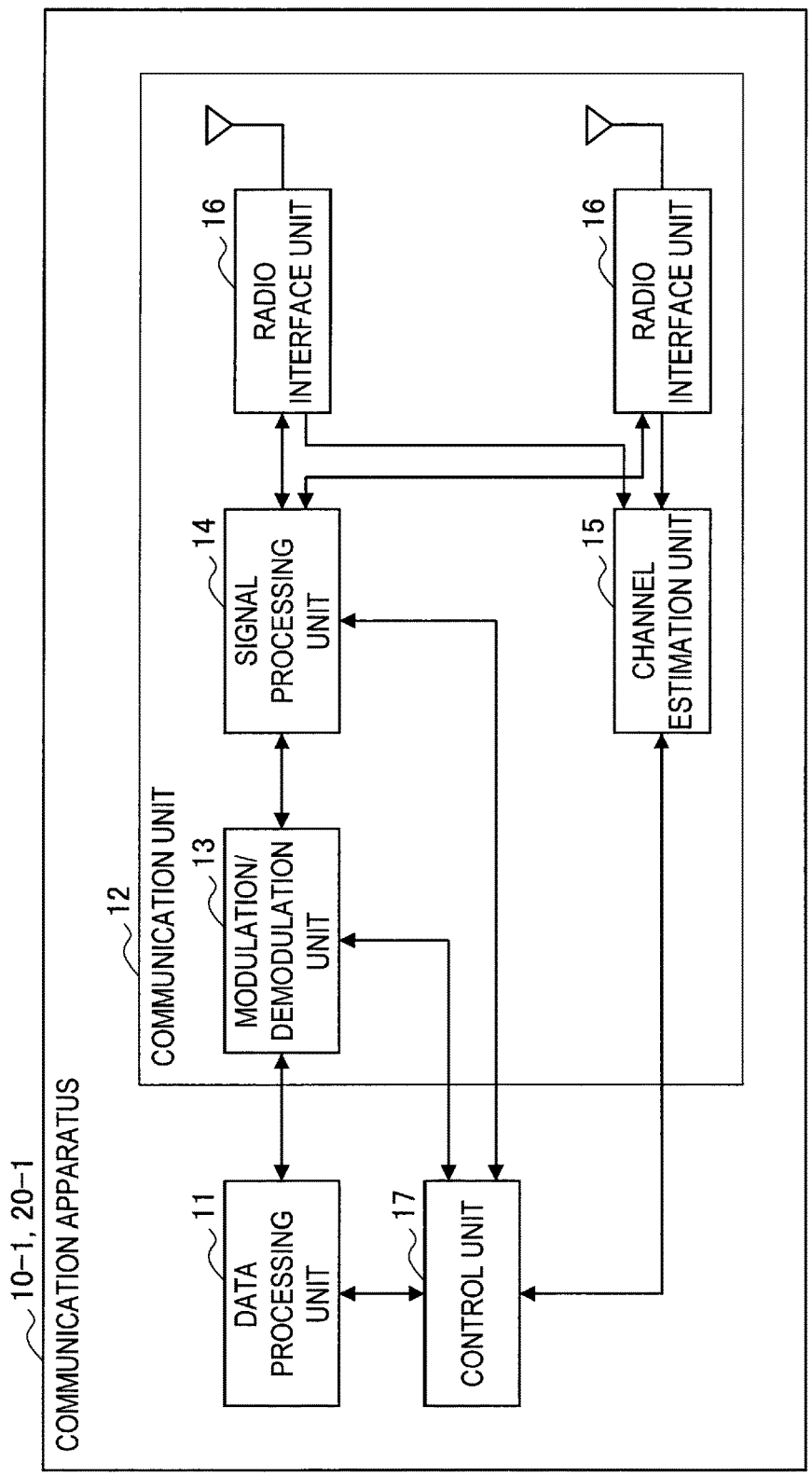

[Fig. 3]
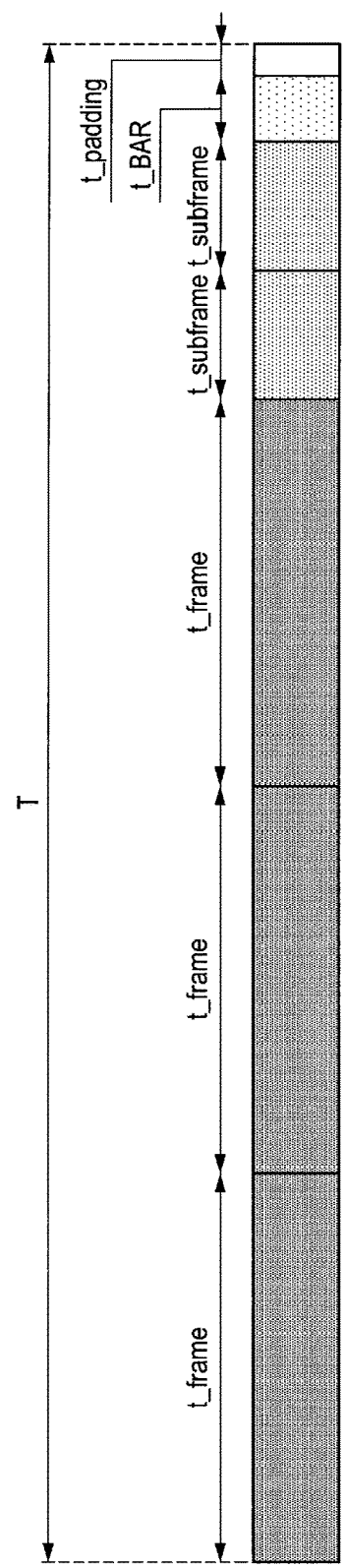

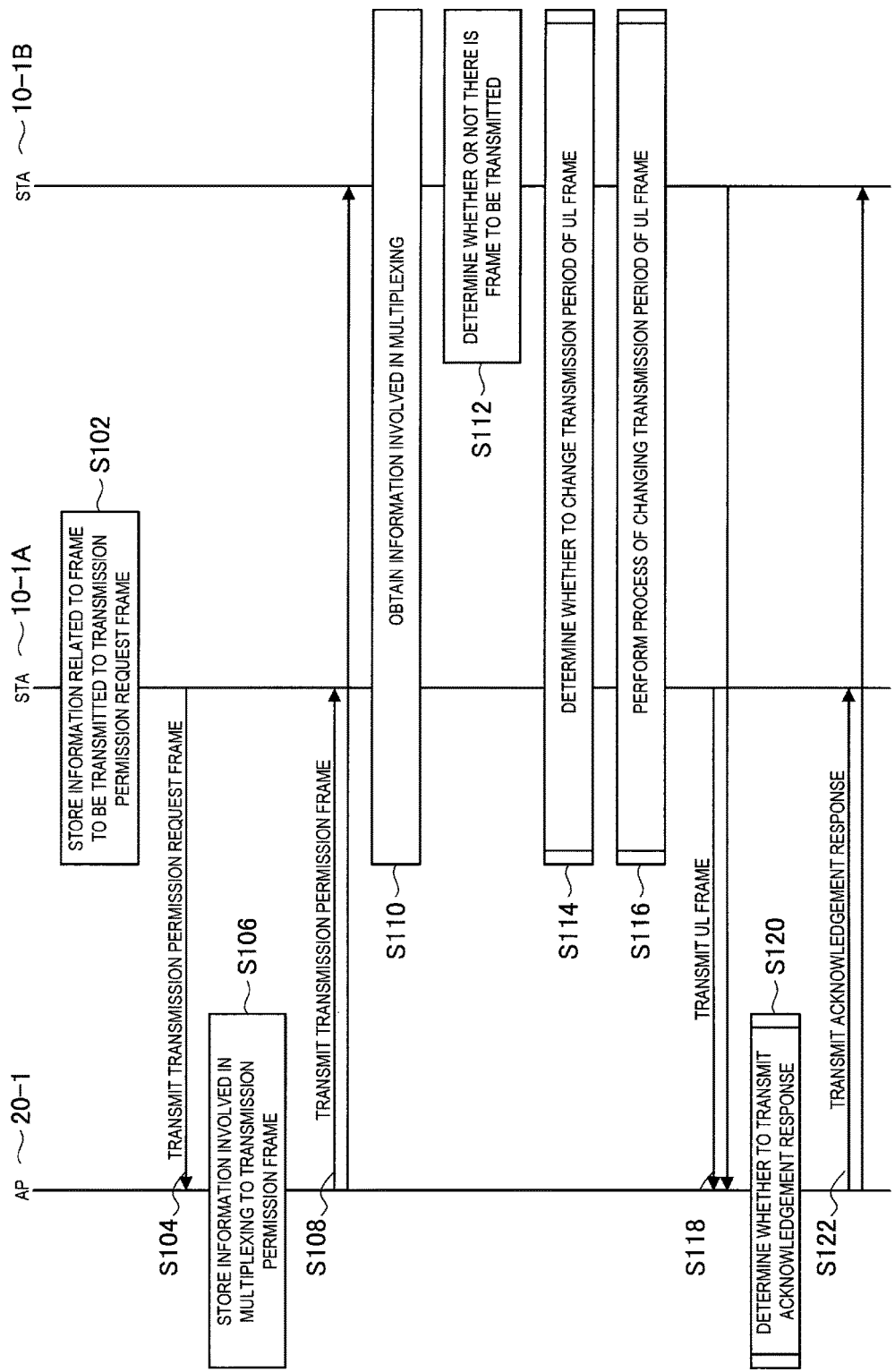

[Fig. 5]
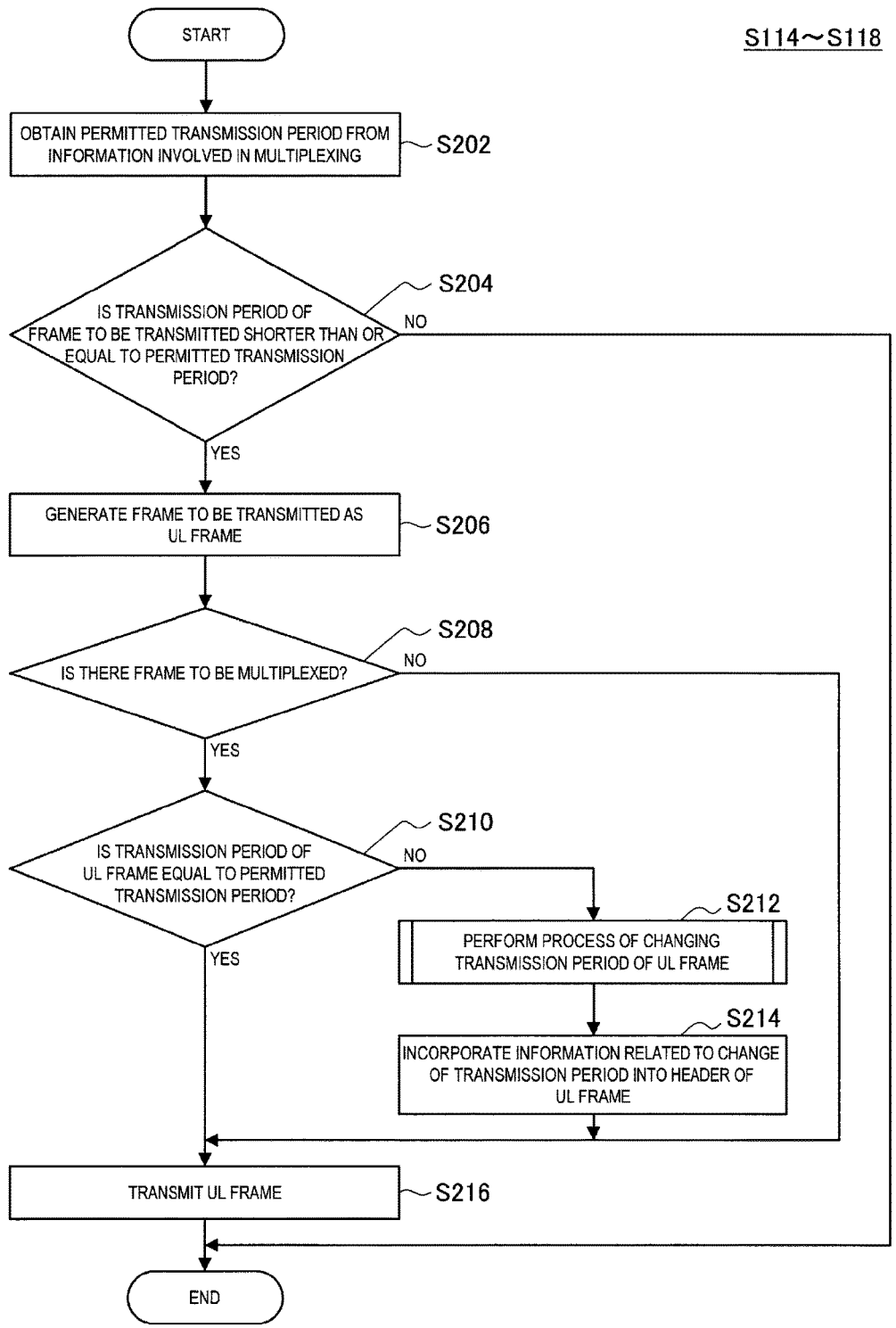

[Fig. 6]
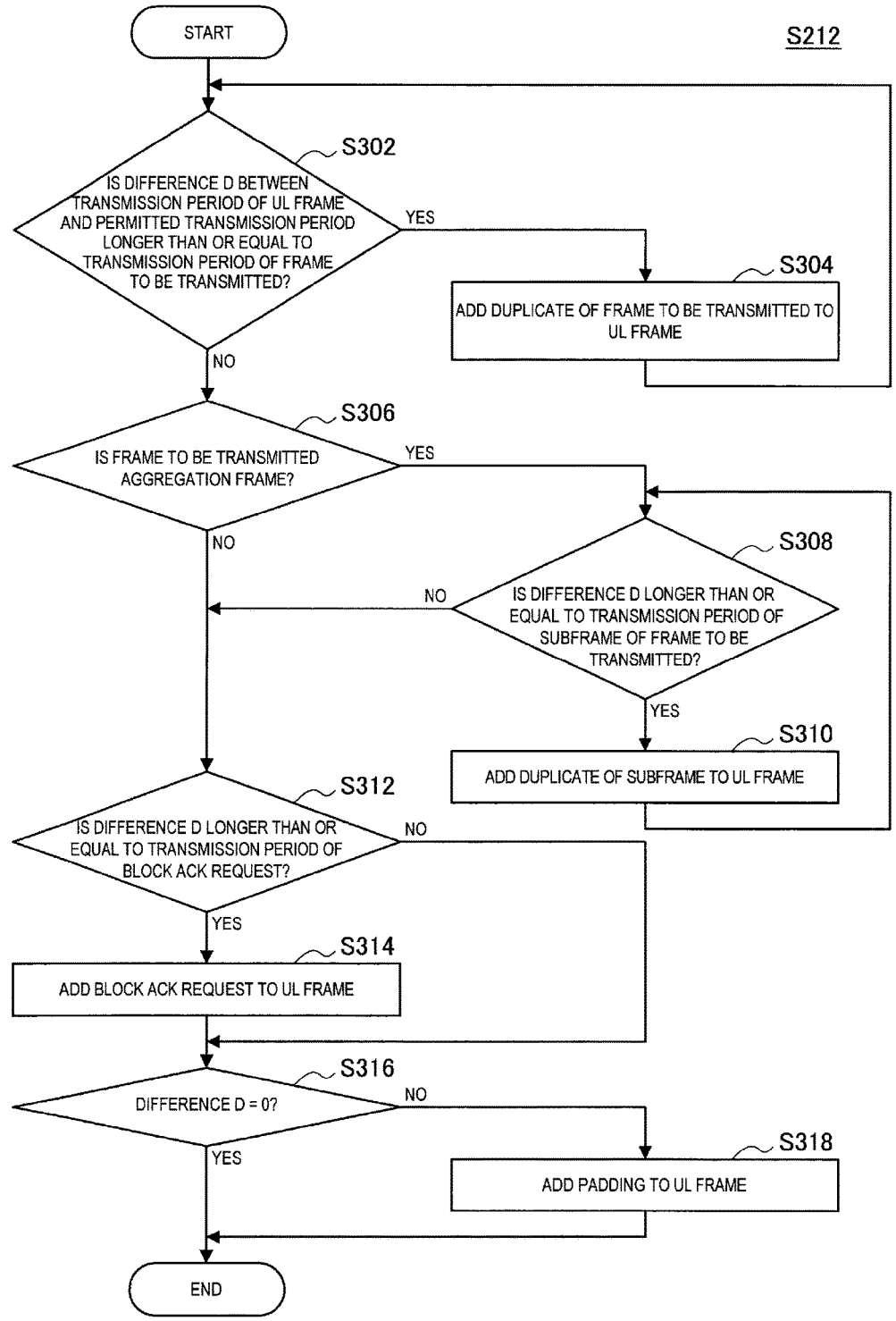

[Fig. 7]
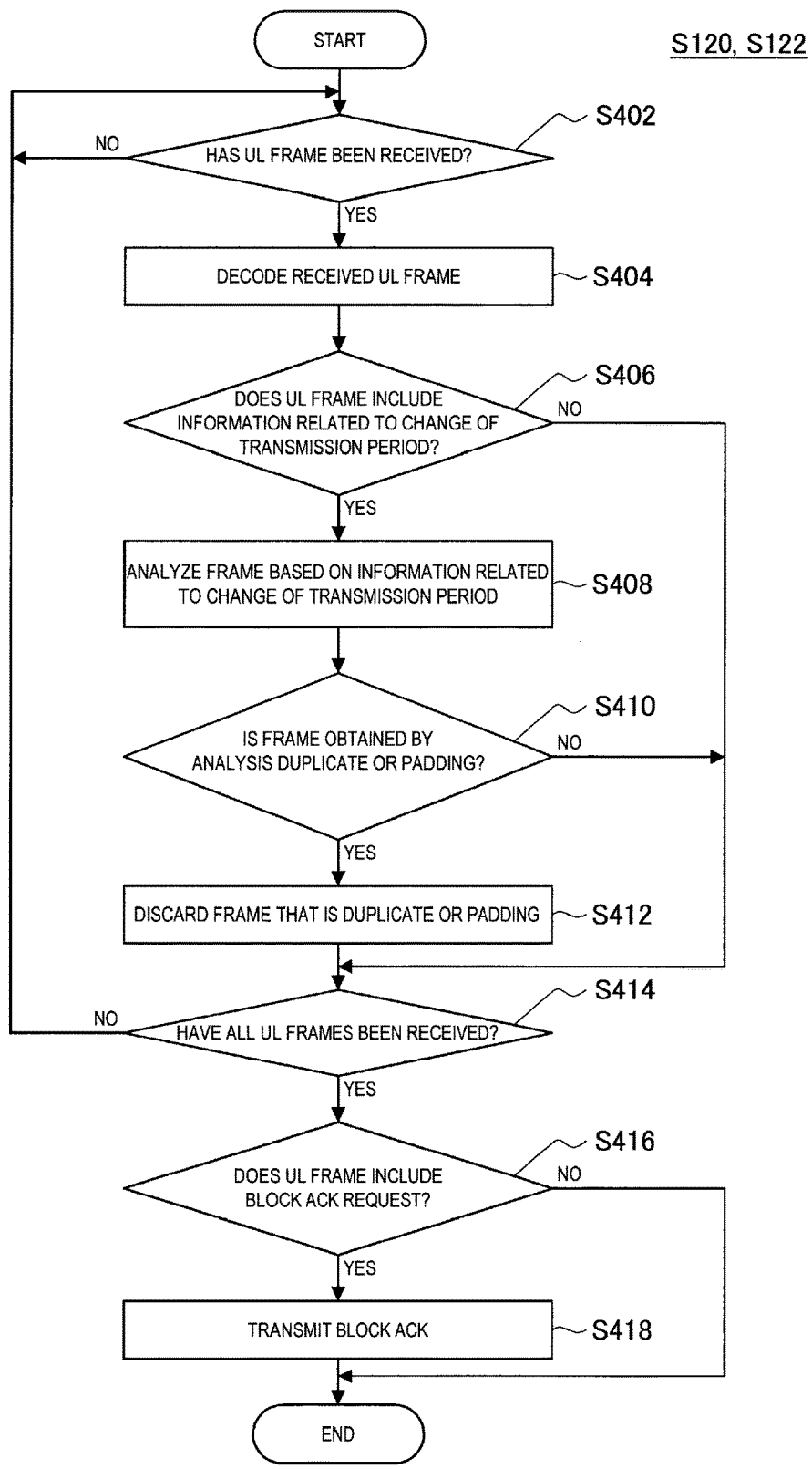

[Fig. 8]
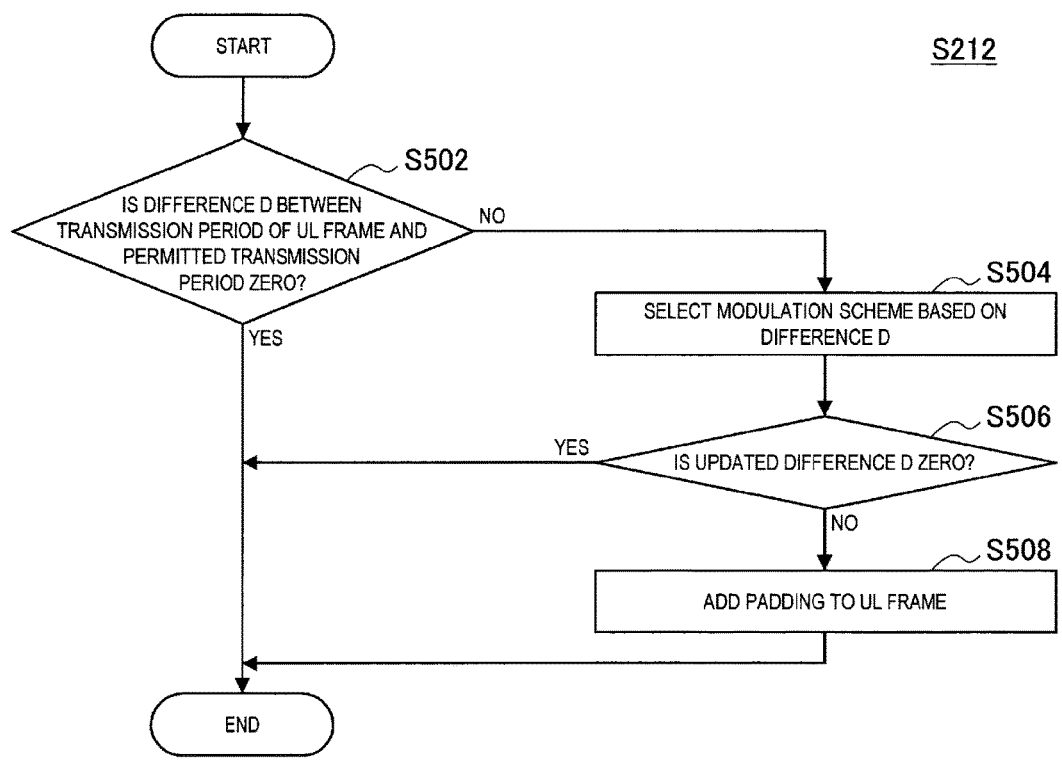

[Fig. 9]
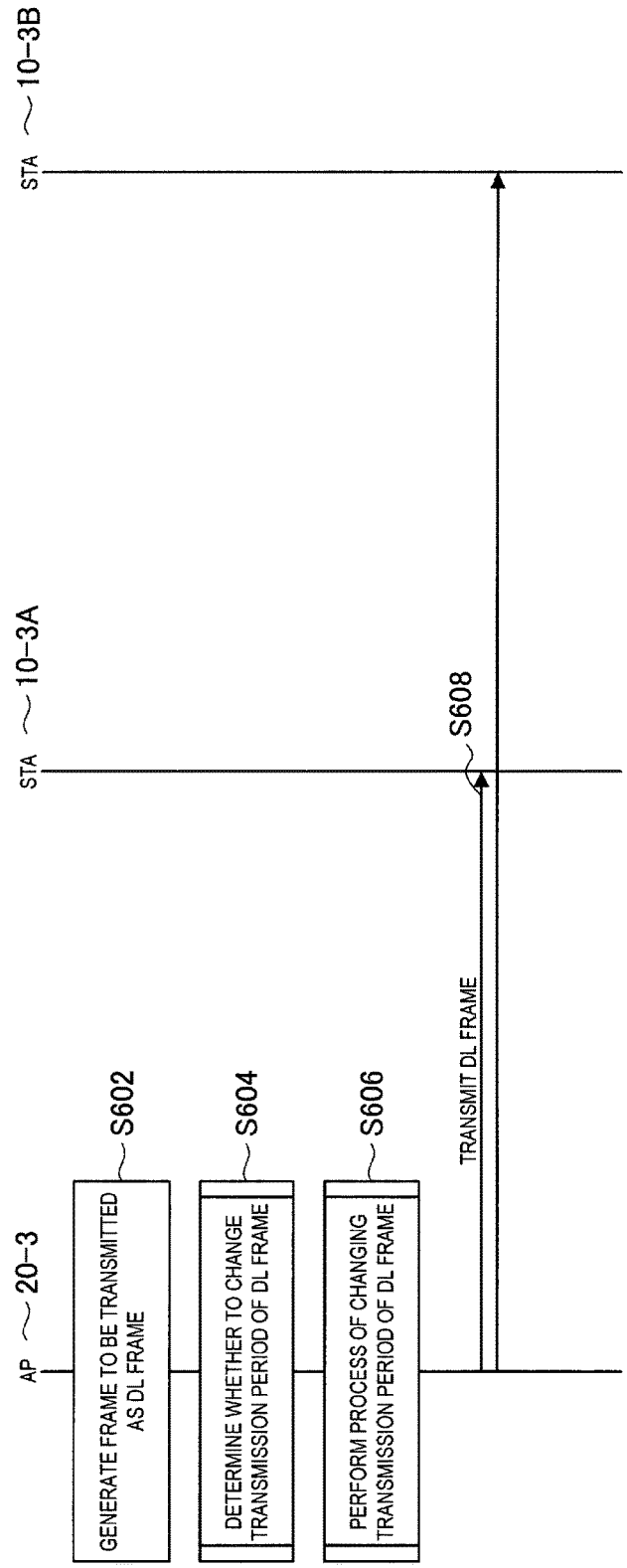

[Fig. 10]
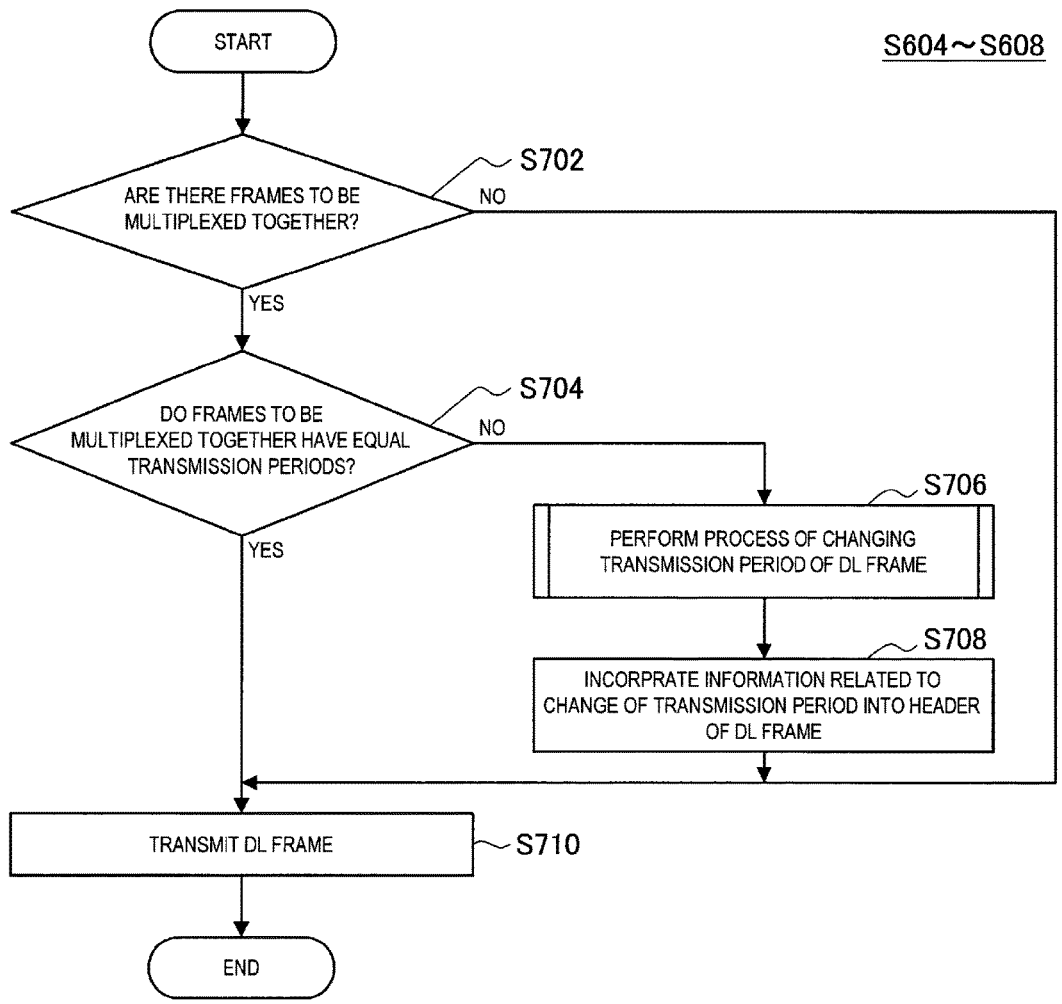

[Fig. 11]
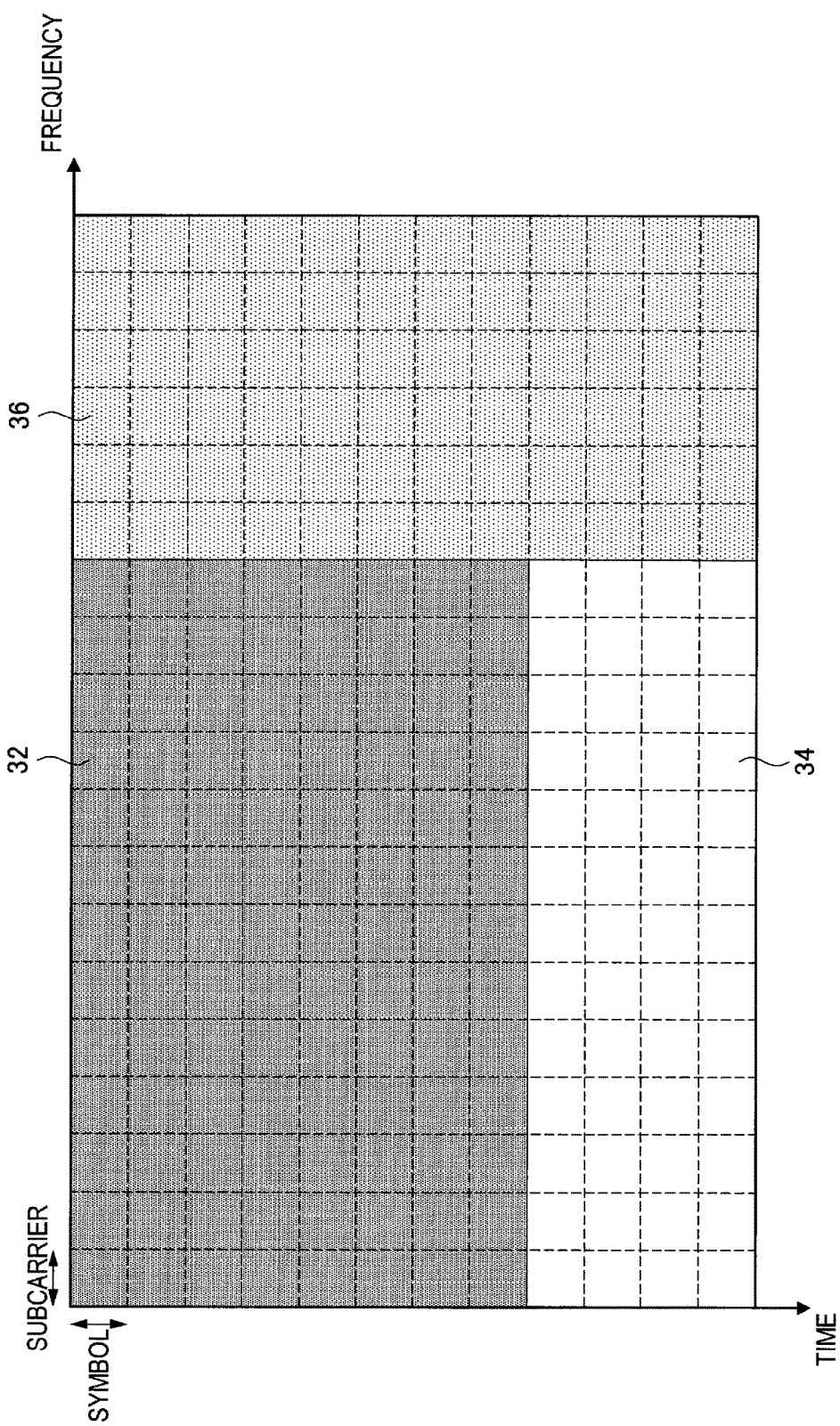

[Fig. 12]
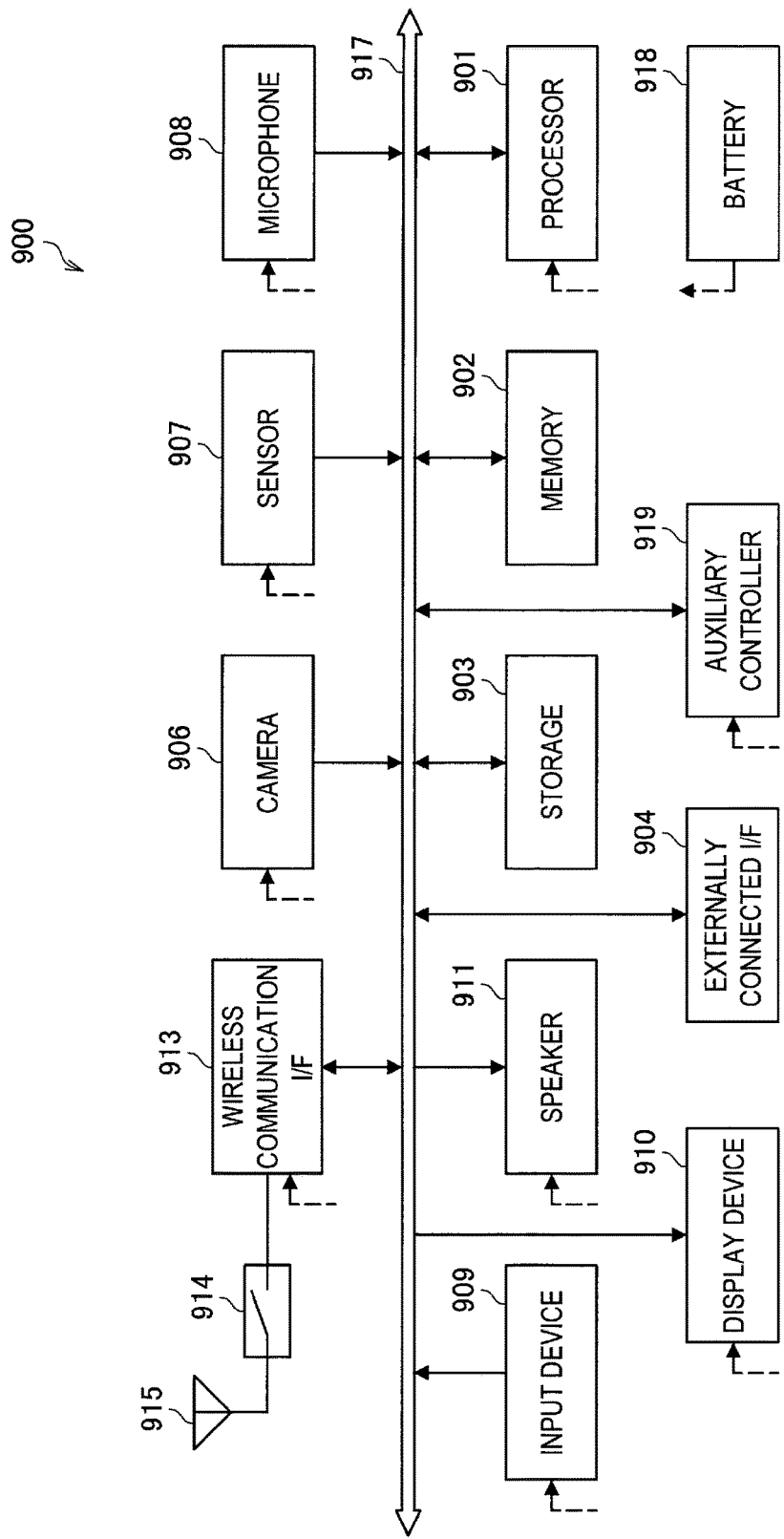

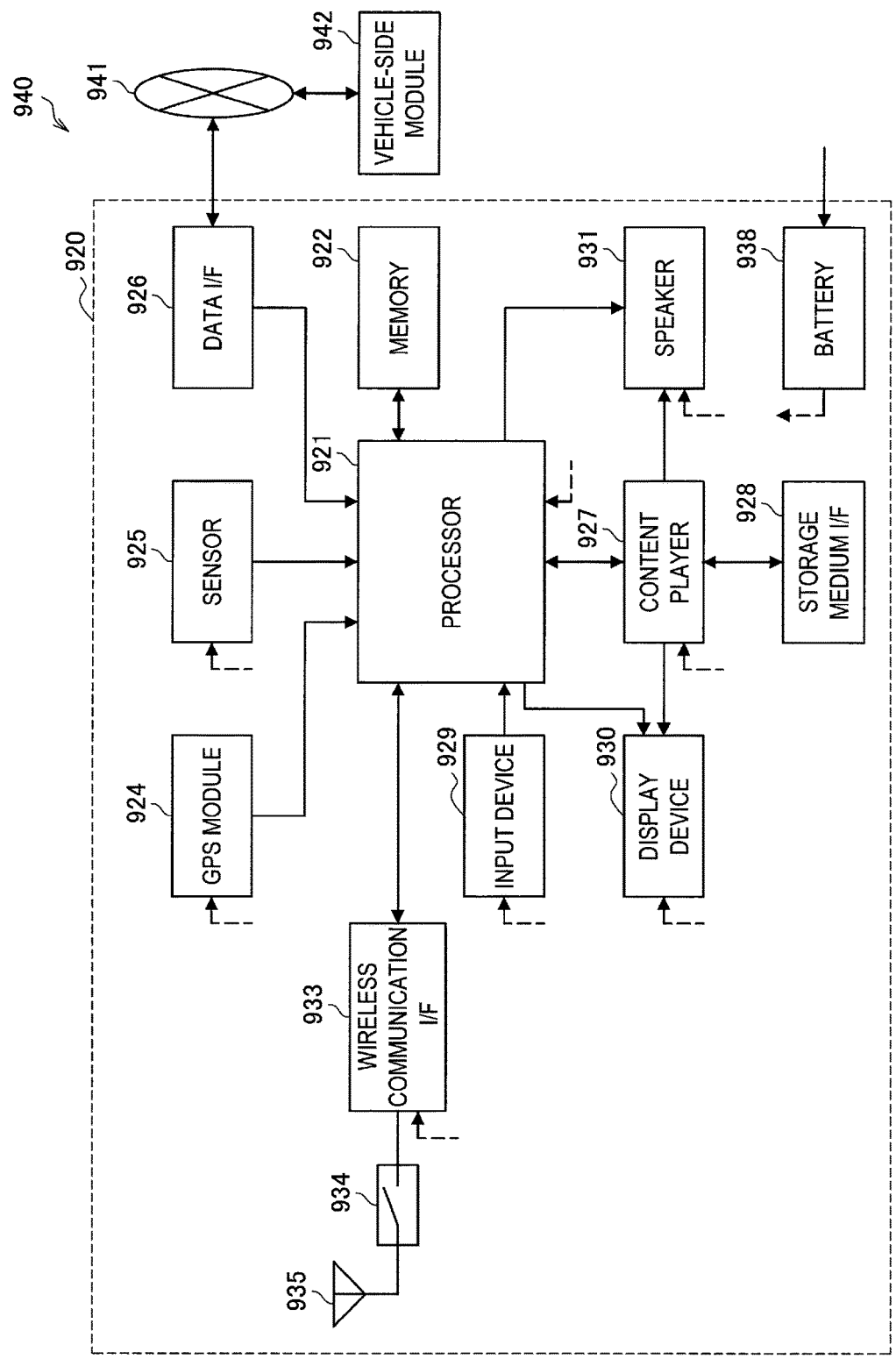
[Fig. 13]

[Fig. 14]
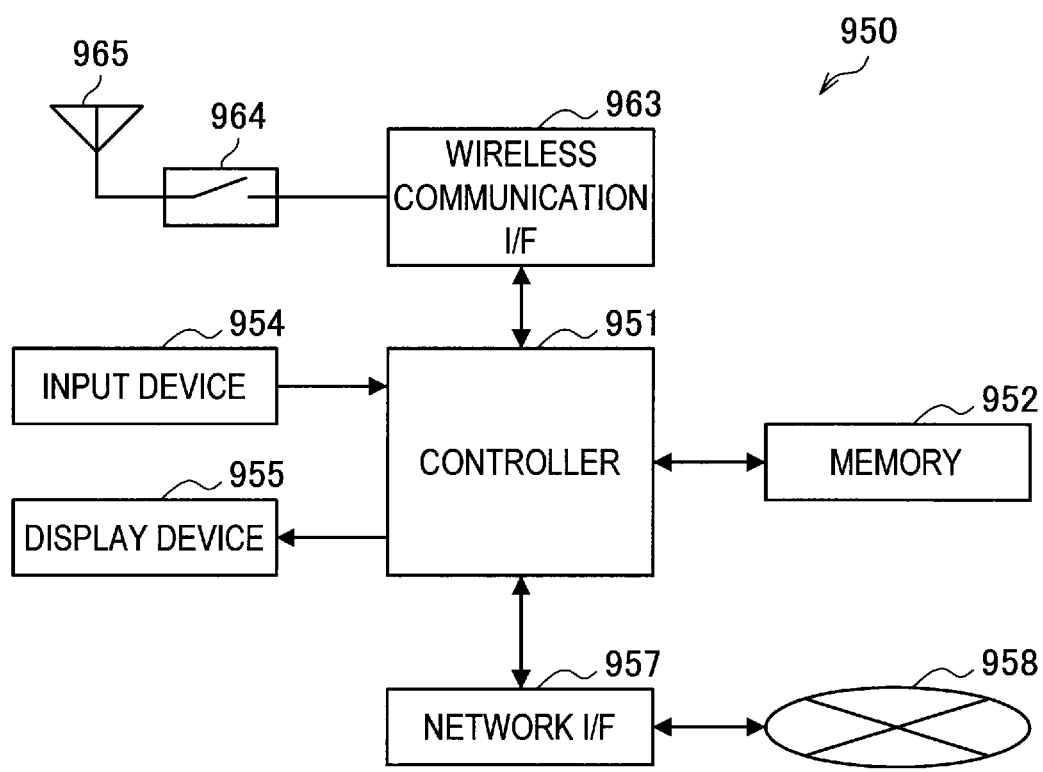

COMMUNICATION APPARATUS AND COMMUNICATION METHOD

CROSS REFERENCE TO RELATED APPLICATIONS

This application claims the benefit of Japanese Priority Patent Application JP 2014-218185 filed Oct. 27, 2014, the entire contents of which are incorporated herein by reference.

TECHNICAL FIELD

The present disclosure relates to communication apparatuses and communication methods.

BACKGROUND ART

Wireless local area networks (LANs), typified by IEEE (Institute of Electrical and Electronics Engineers) 802.11, have in recent years been widespread, leading to an increase in the information amount of transmitted contents and the number of wireless LAN-capable products. Therefore, to improve the efficiency of communication over an entire network, the standard IEEE 802.11 is still being enhanced.

In the 802.11ac standard, which is an example enhanced version of the standard IEEE 802.11, multi-user multi-input multi-output (MU-MIMO) is employed for a downlink (DL). MU-MIMO is a technique for allowing transmission of a plurality of signals during the same period of time through space-division multiplexing. The technique can improve the efficiency of use of frequencies, for example.

However, different communication apparatuses may transmit frames during different transmission periods. In this case, the number of multiplexed frames fluctuates during a period of time when the frames are received. Therefore, the reception power of a communication apparatus that receives multiplexed frames fluctuates during the reception period. The fluctuation of the reception power may have an influence on the performance of reception. To address this problem, a technique of transmitting frames during equal transmission periods has been proposed.

For example, PTL1 describes a communication apparatus that appropriately adds a padding to a plurality of frames having different transmission periods and thereby transmits the plurality of frames during equal transmission periods.

CITATION LIST

Patent Literature

PTL 1: JP 2010-263490A

SUMMARY

Technical Problem

However, in the subject matter described in PTL1, it may be difficult to efficiently use wireless communication resources. For example, in the subject matter described in PTL1, wireless communication resources are consumed by a padding, which is invalid as data.

Under such circumstances, the present disclosure proposes a novel and improved communication apparatus and communication method that can simultaneously achieve effective use of wireless communication resources and stabilization of reception performance in wireless multiplex communication.

Solution to Problem

According to an embodiment of the present disclosure, there is provided a communication apparatus including: a processing unit configured to process a frame in a manner that the frame has redundancy corresponding to first information indicating at least one of a first transmission period or a band used for transmission, or using a modulation scheme corresponding to the first information.

According to an embodiment of the present disclosure, there is provided a communication method including: processing a frame in a manner that the frame has redundancy corresponding to first information indicating at least one of a first transmission period or a band used for transmission, or using a modulation scheme corresponding to the first information.

According to an embodiment of the present disclosure, there is provided a communication apparatus including: circuitry configured to perform a process on a frame so that the frame has redundancy corresponding to first information indicating at least one of a first transmission period or a band used for transmission, or uses a modulation scheme corresponding to the first information.

According to an embodiment of the present disclosure, there is provided a communication method including: performing a process, with circuitry, on a frame so that the frame has redundancy corresponding to first information indicating at least one of a first transmission period or a band used for transmission, or uses a modulation scheme corresponding to the first information.

According to an embodiment of the present disclosure, there is provided a non-transitory computer-readable medium encoded with computer-readable instructions that, when executed by circuitry, cause the circuitry to perform a method comprising:

performing a process on a frame so that the frame has redundancy corresponding to first information indicating at least one of a first transmission period or a band used for transmission, or uses a modulation scheme corresponding to the first information.

Advantageous Effects of Invention

As described above, according to one or more of embodiments of the present disclosure, provided is a communication apparatus and communication method that can simultaneously achieve effective use of wireless communication resources and stabilization of reception performance in wireless multiplex communication. Note that the above advantageous effects are not necessarily limiting. In addition to or instead of the above advantageous effects, any of the advantageous effects described in the present specification or other advantageous effects apparent from the present specification may be provided.

BRIEF DESCRIPTION OF DRAWINGS

FIG. 1 is a diagram showing an example configuration of a communication system according to an embodiment of the present disclosure.

FIG. 2 is a block diagram schematically showing a functional configuration of an STA and an AP according to a first embodiment of the present disclosure.

FIG. 3 is a diagram showing an example configuration of a UL frame generated by an STA according to this embodiment.

FIG. 4 is a sequence diagram showing the concept of a process in a communication system according to this embodiment.

FIG. 5 is a flowchart showing the concept of a process of transmitting a UL frame in an STA according to this embodiment.

FIG. 6 is a flowchart showing the concept of a process of changing a transmission period of a UL frame in an STA according to this embodiment.

FIG. 7 is a flowchart showing the concept of a process of receiving a UL frame in an AP according to this embodiment.

FIG. 8 is a flowchart showing the concept of a process of changing a transmission period of a UL frame in an STA according to a second embodiment of the present disclosure.

FIG. 9 is a sequence diagram showing the concept of a communication system according to a third embodiment of the present disclosure.

FIG. 10 is a flowchart showing the concept of a process of transmitting a DL frame in an AP according to this embodiment.

FIG. 11 is a diagram showing an example of resource block allocation in a fourth embodiment of the present disclosure.

FIG. 12 is a block diagram showing an example schematic configuration of a smartphone.

FIG. 13 is a block diagram showing an example schematic configuration of a car navigation device.

FIG. 14 is a block diagram showing an example schematic configuration of a wireless access point.

DESCRIPTION OF EMBODIMENTS

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be provided in the following order.
1. Overview of communication system according to embodiment of present disclosure
2. First embodiment (example in which duplicate frame is added)
3. Second embodiment (example in which modulation scheme is changed)
4. Third embodiment (example application to communication of base station)
5. Fourth embodiment (example in which frequency-division multiplex communication is used)
6. Application example
7. Conclusion

1. Overview of Communication System According to Embodiment of Present Disclosure Firstly, an overview of a communication system according to an embodiment of the present disclosure will be described with reference to FIG. 1. FIG. 1 is a diagram showing an example configuration of the communication system of the embodiment of the present disclosure.

The communication system includes a base station 20 and a plurality of communication apparatuses 10. The base station 20 and the communication apparatuses 10, which have a wireless communication function, perform multiplex communication. The base station 20 operates as an access point (hereinafter also referred to as an "AP"), and the communication apparatuses 10 operate as a station (hereinafter also referred to as an "STA"). The base station 20 and the communication apparatus 10 are also hereinafter referred to as an "AP 20" and an "STA 10," respectively. Therefore, in the communication system, multiplex communication is available between the AP 20 and the STA 10. Note that communication from the AP 20 to the STA 10 is also referred to as a "downlink (DL)," and communication from the STA 10 to the AP 20 is also referred to as an "uplink (UL)."

For example, as shown in FIG. 1, the communication system may include an AP 20 and a plurality of STAs 10A to 10D. The AP 20 and the STAs 10A to 10D are connected together through wireless communication to transmit and receive frames directly to and from each other. For example, the AP 20 is an IEEE 802.11ac-compliant communication apparatus that performs space-division multiple access (SDMA) using an adaptive array antenna.

Here, typically, if a plurality of STAs 10 transmit frames during different transmission periods, the number of multiplexed frames fluctuates during a period of time when the frames are received. Therefore, the reception power of the AP 20 that receives multiplexed frames sharply fluctuates during the reception period. The fluctuation of the reception power may have an influence on the reception performance of the AP 20.

In contrast to this, the technique of appropriately adding a padding to a plurality of frames having different transmission periods and thereby transmitting the plurality of frames during equal transmission periods, has been proposed. However, wireless communication resources are consumed by a padding, which is invalid as data.

To overcome such a problem, the present disclosure proposes a communication apparatus and communication method that can simultaneously achieve effective use of wireless communication resources and stabilization of reception performance in wireless multiplex communication. Such a communication apparatus and communication method will be described in detail below. Although an example communication system including the AP 20 and the STAs 10 has been described with reference to FIG. 1, one of the STAs 10 may be a communication apparatus that has a plurality of direct links with the other STAs 10, instead of the AP 20. In this case, the above DL may mean "simultaneous transmission from one STA to a plurality of STAs," and the above UL may mean "simultaneous transmission from a plurality of STAs to one STA." Also, for the sake of convenience, the STAs 10 according to first to fourth embodiments are distinguished from each other by numerals corresponding to the respective embodiments added to the end of the reference numeral "10," such as STA 10-1, STA 10-2, etc.

2. First Embodiment (Example in which Duplicate Frame is Added)

An overview of a communication system according to an embodiment of the present disclosure has been described above. Next, an STA 10-1 according to a first embodiment of the present disclosure will be described. In this embodiment, the STA 10-1 adds a duplicate of a frame to be transmitted, to a UL frame, in space-division multiplex communication.

<2-1. Functions of Communication Apparatus>

Firstly, a configuration of the STA 10-1 and an AP 20-1 according to the first embodiment of the present disclosure will be described with reference to FIG. 2. FIG. 2 is a block diagram schematically showing a functional configuration of the STA 10-1 and the AP 20-1 of the first embodiment of the present disclosure.

As shown in FIG. 2, the STA 10-1 and the AP 20-1 include a data processing unit 11, a communication unit 12, and a control unit 17. Firstly, basic functions of the STA 10-1 and the AP 20-1 will be described.

((Basic Functions))

The data processing unit 11 performs a process for transmission and reception of data. Specifically, the data processing unit 11 generates a frame based on data from a higher-level layer of communication, and provides the generated frame to a modulation/demodulation unit 13 described below. For example, the data processing unit 11 generates a frame (or packets) from data, and performs processes, such as addition of a MAC header for media access control (MAC), addition of an error detection code, and the like, on the generated frame. The data processing unit 11 also extracts data from a received frame, and provides the extracted data to a higher-level layer of communication. For example, the data processing unit 11 obtains data by performing, on a received frame, analysis of a MAC header, detection and correction of code error, a reordering process, and the like As shown in FIG. 2, the communication unit 12 includes a modulation/demodulation unit 13, a signal processing unit 14, a channel estimation unit 15, and radio interface units 16.

The modulation/demodulation unit 13 performs a modulation process and the like on a frame. Specifically, the modulation/demodulation unit 13 performs encoding, interleaving, and modulation on a frame provided by the data processing unit 11, according to coding and modulation schemes and the like set by the control unit 17, to generate a symbol stream. Thereafter, the modulation/demodulation unit 13 provides the generated symbol stream to the signal processing unit 14. The modulation/demodulation unit 13 also performs demodulation and decoding or the like on the symbol stream provided by the signal processing unit 14 to obtain a frame, and provides the obtained frame to the data processing unit 11 or the control unit 17.

The signal processing unit 14 performs a process involved in space-division multiplex communication. Specifically, the signal processing unit 14 performs a signal process involved in space separation, on a symbol stream provided by the modulation/demodulation unit 13, and provides symbol streams obtained by the process to the respective radio interface units 16. The signal processing unit 14 also performs a spatial process, such as a symbol stream separation process or the like, on symbol streams obtained from the radio interface units 16, and provides a symbol stream obtained by the process to the modulation/demodulation unit 13.

The channel estimation unit 15 estimates a channel gain. Specifically, the channel estimation unit 15 calculates complex channel gain information from a preamble part or training signal part of a signal contained in the symbol stream obtained from the radio interface unit 16. Note that the calculated complex channel gain information is provided to the modulation/demodulation unit 13 and the signal processing unit 14 through the control unit 17, and is used in a modulation process and a space separation process or the like.

The radio interface unit 16, which includes an antenna, transmits and receives a signal through the antenna. Specifically, the radio interface unit 16 converts a signal contained in a symbol stream provided from the signal processing unit 14, into an analog signal, and performs amplification, filtering, and frequency upconversion on the analog signal. Thereafter, the radio interface unit 16 transmits the processed signal through the antenna. The radio interface unit 16 also performs, on a signal from the antenna, reverse processes to those which are performed for signal transmission, such as frequency downconversion, digital signal conversion, and the like, and provides the signal obtained by the processes to the channel estimation unit 15 and the signal processing unit 14. Note that the STA 10-1 may include only one radio interface unit 16.

Note that, in the description that follows, the modulation/demodulation unit 13, the signal processing unit 14, the channel estimation unit 15, and the radio interface unit 16 may also be collectively referred to as the communication unit 12.

The control unit 17 controls an overall operation of the STA 10-1. Specifically, the control unit 17 transfers information between each function, sets communication parameters, and schedules frames (or packets) in the data processing unit 11, for example.

((Functions of STA))

Next, functions of the STA 10-1 will be described.

(Function of Obtaining Information Involved in Complexing)

The data processing unit 11 generates a transmission permission request frame. Specifically, the data processing unit 11 generates information related to a frame to be transmitted, and a transmission permission request frame including the generated information. For example, the information related to a frame to be transmitted may be at least one of information indicating a transmission period of the frame to be transmitted and information indicating transmission start time of the frame to be transmitted. For example, the transmission permission request frame may be a request-to-send (RTS) frame.

The communication unit 12 transmits and receives a frame involved in transmission permission. Specifically, the communication unit 12 transmits a transmission permission request frame to the AP 20-1, and a transmission permission frame from the AP 20-1.

The control unit 17 obtains information involved in multiplexing, as first information, from the AP 20-1 through wireless communication. Specifically, the control unit 17 obtains information involved in multiplexing from the AP 20-1 using a frame exchange process between the STA 10-1 and the AP 20-1 involved in transmission permission. For example, the control unit 17 causes the data processing unit 11 to generate a transmission permission request frame, and the communication unit 12 to transmit the transmission permission request frame. Thereafter, the control unit 17 obtains information involved in multiplexing, as a response to the transmission permission request frame, from the transmission permission frame received from the AP 20-1. Note that the information involved in multiplexing is used in a process of changing a transmission period of a UL frame described below.

(Function of Changing Transmission Period of UL frame)

The data processing unit 11 processes a frame so that the frame has a redundancy corresponding to information indicating a permitted transmission period as a first transmission period. Specifically, the data processing unit 11 adds a duplicate or duplicates of a frame to be transmitted to a UL frame within a range where the permitted transmission period is not exceeded. When a frame to be transmitted is an aggregation frame, the data processing unit 11 adds a duplicate or duplicates of a portion of the frame to be transmitted (hereinafter also referred to as a subframe) to a UL frame within a range where the permitted transmission period is not exceeded. Note that, as described below, the permitted transmission period is specified by the control unit 17.

Moreover, when the transmission period of the UL frame to which a duplicate or duplicates of the frame have been added is less than the permitted transmission period, the data processing unit 11 adds a block ACK request (BAR) frame and/or a padding to the UL frame. A configuration of the frame generated by the data processing unit 11 will be described with reference to FIG. 3. FIG. 3 is a diagram showing an example configuration of the UL frame generated by the STA 10-1 of this embodiment.

The UL frame generated by the data processing unit 11 may include a frame to be transmitted, and a duplicate(s) of the frame to be transmitted, a duplicate(s) of a portion of the frame to be transmitted, a BAR, and/or a padding. For example, as shown in FIG. 3, the generated UL frame may include a frame to be transmitted, two duplicates of the frame, two duplicates of a subframe of the frame, a BAR, and a padding. Note that t_frame, t_subframe, t_BAR, and t_padding shown in FIG. 3 indicate the transmission period length of a frame to be transmitted, the transmission period length of a subframe of the frame, the transmission period length of a BAR, and the transmission period length of a padding.

Referring back to the description of the function of the STA 10-1 of FIG. 2, the communication unit 12 transmits the UL frame. Specifically, the communication unit 12 transmits the UL frame generated by the data processing unit 11 to the AP 20-1 during the permitted transmission period.

The control unit 17 specifies the permitted transmission period based on the information involved in multiplexing included in the transmission permission frame. Specifically, the information involved in multiplexing is at least one of information indicating the permitted transmission period, information used in calculating the permitted transmission period, and information that can be used to specify an STA 10-1 that is permitted to perform communication. For example, the information that is used to calculate the permitted transmission period may be information related to transmission start time of a UL frame or a transmission period permitted for the STA 10-1. The information that can be used to specify an STA 10-1 that is permitted to perform communication may be information for identifying an STA 10-1 that is permitted to perform space-division multiplex communication or information related to a training signal used by an STA 10-1.

The information related to a transmission period permitted for an STA 10-1 may, for example, be the transmission period of a frame that is to be transmitted by an STA 10-1 that is a sender of a transmission permission request, a value that is uniquely calculated from the transmission period of a frame to be transmitted by an STA 10-1, or a value that is previously possessed by the AP 20-1.

An STA 10-1 that is permitted to perform space-division multiplex communication may be randomly selected from the STAs 10-1 connected to the AP 20-1. If the AP 20-1 stores a previous channel gain, an STA 10-1 that is permitted to perform space-division multiplex communication may be one of the STAs 10-1 whose channel gain is stored, that has a low correlation with the channel gain of an STA 10-1 that has transmitted a transmission permission request frame. An STA 10-1 that is permitted to perform space-division multiplex communication may be indicated by group identification information indicating groups to which the respective STAs 10-1 belong.

The information related to a training signal used for an STA 10-1 may be information related to a training signal for extracting each reference signal from the STA 10-1. The AP 20-1 obtains the channel gain of an STA 10-1 from the reference signal. For example, the information related to a training signal may be identification information of a training signal that is used by each STA 10-1 to be communicated, such as index information. Alternatively, the information related to a training signal may be information indicating a timing at which each STA 10-1 to be communicated transmits a reference signal based on a training signal, such as a position of the reference signal in a training part of a preamble.

If the information involved in multiplexing is the transmission start time of a UL frame, the control unit 17 specifies the permitted transmission period based on the transmission start time, and a transmission period length that is previously obtained or is previously stored in the STA 10-1. In this case, the AP 20-1 does not have to calculate the permitted transmission period, and therefore, the process in the AP 20-1 can be simplified, resulting in a reduction in processing load.

If the information involved in multiplexing is information related to a transmission period permitted for an STA 10-1, the control unit 17 uses a transmission period indicated by the information or a transmission period specified from the information, as the permitted transmission period. In this case, the process of specifying the permitted transmission period is not necessary, or is simplified, and therefore, the processing load on the STA 10-1 can be reduced.

If the information involved in multiplexing is identification information of an STA 10-1 that is permitted to perform space-division multiplex communication, or information related to a training signal used by an STA 10-1, the control unit 17 specifies the permitted transmission period based on a transmission period that is previously obtained or is previously stored in the STA 10-1. In this case, the existing information is used, and therefore, it is not necessary to additionally provide the information involved in multiplexing, leading to simplification of a process and a reduction in the amount of communication.

Thus, the information involved in multiplexing includes at least one of information indicating the permitted transmission period, information used in calculating the permitted transmission period, or information that can be used to specify an STA 10-1 that can perform transmission during the permitted transmission period. Therefore, information that is transmitted can be selected according to the specifications of the STA 10-1 and the AP 20-1. For example, this embodiment may be applicable to a control access network in addition to a random access network.

A frame that has been processed is space-division multiplexed with a processed frame transmitted from another STA 10-1 as a third communication apparatus. Therefore, a plurality of frames may be transmitted at the same timing and frequency, and therefore, the efficiency of communication in transmitting processed frames can be improved.

As the above STA 10-1 that can perform transmission, selected is an STA 10-1 that has a lower correlation with the channel gain of an STA 10-1 that has transmitted a transmission permission request frame than those of the other STAs 10-1. Therefore, compared to a case where an STA 10-1 having a high correlation with the channel gain of an STA 10-1 that has transmitted a transmission permission request frame is selected, space-division multiplex communication having high communication quality can be performed.

The above information that can be used to specify an STA 10-1 that can perform transmission includes information indicating a group of STAs 10-1 that are a destination of a transmission permission frame. Therefore, it is not necessary for the AP 20-1 to specify each individual STA 10-1, and therefore, a process in the AP 20-1 can be simplified.

((Functions of AP))

Next, functions of the AP 20-1 will be described.

(Function of Providing Information Involved in Multiplexing)

The data processing unit 11 generates a transmission permission frame. Specifically, the data processing unit 11 generates a transmission permission frame including the above information involved in multiplexing. For example, the transmission permission frame may be a clear-to-send (CTS) frame.

The communication unit 12 transmits and receives a frame involved in transmission permission. Specifically, the communication unit 12 receives a transmission permission request frame from an STA 10-1, and a transmission permission frame to the STA 10-1.

The control unit 17 performs a transmission permission process with respect to a transmission permission request. Specifically, the control unit 17, when receiving a transmission permission request frame from an STA 10-1, determines whether to permit the STA 10-1 to perform transmission. If the control unit 17 determines to permit the STA 10-1 to perform transmission, the control unit 17 generates information involved in multiplexing, causes the data processing unit 11 to generate a transmission permission frame, and causes the communication unit 12 to transmit the transmission permission frame.

<2-2. Process in Communication Apparatus>

Next, processes in the communication system of this embodiment and the STA 10-1 and the AP 20-1 will be described with reference to FIGS. 4 to 7. Firstly, a flow of a process in the communication system will be described with reference to FIG. 4. FIG. 4 is a sequence diagram showing the concept of a process in the communication system according to this embodiment.

(Flow of Overall Process)

Firstly, an STA 10-1A stores information related to a frame to be transmitted to at least one of a header or payload of a transmission permission request frame (step S102). Specifically, the data processing unit 11 generates information related to a frame to be transmitted according to an instruction from the control unit 17, and generates a transmission permission request frame including the generated information.

Next, the STA 10-1A transmits the transmission permission request frame to the AP 20-1 (step S104). Specifically, the communication unit 12 transmits the transmission permission request frame generated by the data processing unit 11 according to an instruction from the control unit 17.

The AP 20-1, when receiving the transmission permission request frame, stores information involved in multiplexing to at least one of a header or payload of a transmission permission frame (step S106). Specifically, the data processing unit 11 obtains information related to a frame to be transmitted, from the transmission permission request frame received by the communication unit 12. The control unit 17 also determines whether to permit transmission with respect to the transmission permission request. If the control unit 17 determines to permit transmission, the control unit 17 generates information involved in multiplexing based on, for example, the obtained information related to a frame to be transmitted to the STA 10-1, and causes the data processing unit 11 to generate a transmission permission frame including the information involved in multiplexing. Note that if the control unit 17 determines not to permit transmission, the control unit 17 causes the data processing unit 11 to generate information indicating that transmission is not permitted and/or that transmission permission has been given to another STA 10-1.

Next, the AP 20-1 transmits the transmission permission frame to the STA 10-1A and an STA 10-1B (step S108). The communication unit 12 transmits the transmission permission frame generated by the data processing unit 11 according to an instruction from the control unit 17. Note that the transmission permission frame includes information specifying, as a destination, an STA 10-1 (e.g., the STAs 10-1A and 10-1B) that is permitted to transmit a UL frame.

Each of the STAs 10-1A and 10-1B, when receiving the transmission permission frame, obtains the information involved in multiplexing (step S110). Specifically, when the communication unit 12 receives the transmission permission frame, the data processing unit 11 obtains the information involved in multiplexing from the transmission permission frame.

Next, the STA 10-1B, which has not sent a transmission request, determines whether or not there is a frame to be transmitted (step S112). Specifically, the control unit 17 determines whether or not there is a frame to be transmitted, by referencing a transmission buffer, for example. If the control unit 17 determines that there is a frame to be transmitted, control proceeds to the next step S114. Otherwise, the process is ended.

Next, the STAs 10-1A and 10-1B determine whether to change the transmission period of a UL frame (step S114), and performs a process of changing the transmission period of a UL frame (step S116). Thereafter, the STAs 10-1A and 10-1B transmit a UL frame to the AP 20-1 (step S118). This will be described in detail below.

The AP 20-1, when receiving a UL frame, determines whether to transmit an acknowledgement response (step S120), and transmits the acknowledgement response to the STAs 10-1A and 10-1B (step S122). This will be described in detail below.

(UL Frame Transmission Process)

Next, the UL frame transmission process (steps S114 to S118) in the STA 10-1 will be described in detail with reference to FIG. 5. FIG. 5 is a flowchart showing the concept of the UL frame transmission process in the STA 10-1 according to this embodiment.

Initially, the STA 10-1 obtains the permitted transmission period from the information involved in multiplexing (step S202). Specifically, the control unit 17 specifies the permitted transmission period based on the information involved in multiplexing. Note that, as described above, the control unit 17 specifies the permitted transmission period using a technique that varies depending on the type of the information involved in multiplexing.

Next, the STA 10-1 determines whether or not the transmission period of a frame to be transmitted is shorter than or equal to the permitted transmission period (step S204). Specifically, the control unit 17 estimates the transmission period of a frame to be transmitted by referencing a transmission buffer, for example, and determines whether or not the estimated transmission period is shorter than or equal to the permitted transmission period.

If the control unit 17 determines that the transmission period of a frame to be transmitted is shorter than or equal to the permitted transmission period, the STA 10-1 generates a frame to be transmitted as a UL frame (step S206). Specifically, if the control unit 17 determines that the estimated transmission period of a frame to be transmitted is shorter than or equal to the permitted transmission period, the control unit 17 causes the data processing unit 11 to generate a frame to be transmitted.

Note that if the control unit 17 determines that the transmission period of a frame to be transmitted exceeds the permitted transmission period, the STA 10-1 ends the process and does not transmit a frame.

Next, the STA 10-1 determines whether or not there is a frame to be multiplexed (step S208). Specifically, the control unit 17 estimates whether or not there is another STA 10-1 that transmits a frame during the permitted transmission period, based on the information involved in multiplexing. For example, the control unit 17 determines whether or not there is another STA 10-1 that transmits a frame during the permitted transmission period, i.e., whether or not there is a frame to be multiplexed, based on the presence or absence of information involved in multiplexing, or the above information that can be used to specify an STA 10-1 permitted to perform communication, or the like.

If the control unit 17 determines that there is a frame to be multiplexed, the STA 10-1 determines that the transmission period of a UL frame is equal to the permitted transmission period (step S210). Specifically, the control unit 17 determines whether or not the transmission period of a frame to be transmitted that is generated as a UL frame is equal to the permitted transmission period, by comparing the transmission period with the permitted transmission period.

If the control unit 17 determines that the transmission period of a UL frame is different from the permitted transmission period, the STA 10-1 performs a process of changing the transmission period of a UL frame (step S212). This will be described in detail below.

Next, the STA 10-1 incorporates information related to the change of the transmission period (hereinafter also referred to as a transmission period change information) into a header of a UL frame (step S214). Specifically, the data processing unit 11 incorporates the transmission period change information related to the changing process into a header of a UL frame whose transmission period has been changed. For example, the data processing unit 11 may incorporate the transmission period change information into a header of a UL frame. The transmission period change information may be information indicating at least one of the presence or absence of the transmission period changing process, the number of duplicate frames, or a value that is uniquely calculated from the number of duplicate frames.

Next, the STA 10-1 transmits a UL frame to the AP 20-1 (step S216). Specifically, the communication unit 12 transmits a UL frame generated by the data processing unit 11 to the AP 20-1 according to an instruction from the control unit 17. Note that the UL frame is eventually space-division multiplexed with a UL frame transmitted by another STA 10-1.

(Process of Changing Transmission Period of UL Frame)

Next, the process of changing the transmission period of a UL frame (step S212) in the STA 10-1 will be described in detail with reference to FIG. 6. FIG. 6 is a flowchart showing the concept of the process of changing the transmission period of a UL frame in the STA 10-1 according to this embodiment.

Initially, the STA 10-1 determines whether or not a difference (hereinafter referred to as a difference D) between the transmission period of a UL frame and the permitted transmission period is longer than or equal to the transmission period of a frame to be transmitted (step S302). Specifically, the control unit 17 calculates the difference D between the transmission period of a UL frame and the permitted transmission period (hereinafter also referred to as a period T), and determines whether or not the calculated difference D is longer than or equal to the transmission period of a frame to be transmitted.

If the control unit 17 determines that the difference D is longer than or equal to the transmission period of a frame to be transmitted, the STA 10-1 adds a duplicate of the frame to be transmitted to a UL frame (step S304). Specifically, if the control unit 17 determines that the difference D is longer than or equal to a period t_frame, the data processing unit 11 adds a duplicate of a frame to be transmitted to a UL frame. Thereafter, control returns to step S302, in which the determination process is performed again.

If the control unit 17 determines that the difference D is shorter than the transmission period of a frame to be transmitted, the STA 10-1 determines whether or not the frame to be transmitted is an aggregation frame (step S306). Specifically, if the control unit 17 determines that the difference D is shorter than the period t_frame, the STA 10-1 determines whether or not the frame to be transmitted is an aggregation frame. Note that a frame to be transmitted may be another frame that can be separated or divided, instead of an aggregation frame.

If the control unit 17 determines that a frame to be transmitted is an aggregation frame, the STA 10-1 determines whether or not the difference D is longer than or equal to the transmission period of a subframe of the frame to be transmitted (step S308). Specifically, if the control unit 17 determines that a frame to be transmitted is an aggregation frame, the STA 10-1 specifies the transmission period of a subframe included in the aggregation frame. Thereafter, the STA 10-1 determines whether or not the difference D is longer than or equal to the period t_subframe.

If the control unit 17 determines that the difference D is longer than or equal to the transmission period of a subframe of a frame to be transmitted, the STA 10-1 adds a duplicate of the subframe to a UL frame (step S310). Specifically, if the control unit 17 determines that the difference D is longer than or equal to t_subframe, the data processing unit 11 generates a duplicate of the subframe, and adds the generated subframe to a UL frame. Thereafter, control returns to step S308, in which the determination process is performed again. Note that a duplicate of a subframe that is added may be a duplicate of the same or different subframe included in a frame to be transmitted. Alternatively, the data processing unit 11 may include a duplicate of a subframe of the aggregation frame, i.e., a frame to be transmitted, instead of including a duplicate of a frame to be transmitted.

Next, the STA 10-1 determines whether or not the difference D is longer than or equal to the transmission period of a block ACK request (step S312). Specifically, the control unit 17 estimates t_BAR, and determines whether or not the difference D is longer than or equal to the estimated t_BAR.

If the control unit 17 determines that the difference D is longer than or equal to the transmission period of a block ACK request, the STA 10-1 adds a block ACK request to a UL frame (step S314). Specifically, if the control unit 17 determines that the difference D is longer than or equal to t_BAR, the data processing unit 11 adds BAR to a UL frame. Note that the data processing unit 11 may include a block ACK request without including one of the duplicate frame and the duplicate subframe.

Next, the STA 10-1 determines whether or not the difference D is zero (step S316). Specifically, the control unit 17 determines whether or not the difference D is zero or substantially zero.

If the control unit 17 determines that the difference D is not zero, the STA 10-1 adds a padding to a UL frame (step S318). Specifically, if the control unit 17 determines that the difference D is not zero, the data processing unit 11 adds a padding to a UL frame so that the difference D is zero, i.e., the transmission period of a UL frame is equal to the period T.

(UL Frame Reception Process)

Next, the UL frame reception process (steps S120 and S122) in the AP 20-1 will be described in detail with reference to FIG. 7. FIG. 7 is a flowchart showing the concept of the UL frame reception process in the AP 20-1 according to this embodiment.

Initially, the AP 20-1 waits until receiving a UL frame (step S402).

The AP 20-1, when receiving a UL frame, decodes the received UL frame (step S404). Specifically, the communication unit 12 performs space separation and demodulation on the received signal to decode the UL frame.

Next, the AP 20-1 determines whether or not the UL frame includes information related to the change of a transmission period (step S406). Specifically, the data processing unit 11 determines whether or not transmission period change information is included by referencing a header of the UL frame.

If the AP 20-1 determines that the UL frame includes information related to the change of a transmission period, the AP 20-1 analyzes the frame based on the information related to the change of a transmission period (step S408). Specifically, the data processing unit 11 separates the UL frame based on the obtained transmission period change information. Note that if transmission period change information is not included, or the information indicates that the changing process has not been performed, the process of this step is not performed.

Next, the AP 20-1 determines whether or not a portion of the frame obtained by the analysis is a redundant frame or padding (step S410). Specifically, the data processing unit 11 determines whether or not each frame portion obtained by the separation in the analysis is a redundant frame or padding.

If the data processing unit 11 determines that a frame portion is a redundant frame or padding, the AP 20-1 discards the frame portion (step S412). Specifically, if the data processing unit 11 determines that a frame portion obtained by the separation is a redundant frame or padding, the data processing unit 11 discards the frame portion. For example, in the standard IEEE 802.11, it is determined whether or not a received frame is a redundant frame, and if it is determined that a received frame is a redundant frame, the received frame is discarded. Therefore, if the AP 20-1 is compliant with the standard IEEE 802.11, then when a frame to be transmitted and a duplicate of the frame are both successfully received, the duplicate frame is determined to be a redundant frame and is discarded. Therefore, a frame to which a duplicate frame is added is received without an additional process, and therefore, the standard IEEE 802.11 can be backward compatible. Note that if a frame to be transmitted fails to be successfully received while a duplicate of the frame is successfully received, the duplicate frame is not determined to be a redundant frame, and is subjected to the subsequent process, and the frame to be transmitted is discarded.

Next, the AP 20-1 determines whether or not all frames have been received (step S414). Specifically, the control unit 17 determines whether or not a UL frame has been received from all STAs 10-1 that are a destination of a transmission permission frame. Note that when a predetermined time has elapsed since transmission of a transmission permission frame, control proceeds to the next step even if there is a UL frame that has not yet been received.

If the AP 20-1 determines that all frames have been received, the AP 20-1 determines whether or not a UL frame includes a block ACK request (step S416). Specifically, for each UL frame, the data processing unit 11 determines whether or not a BAR is added to the UL frame, based on transmission period change information.

If the AP 20-1 determines that a UL frame includes a block ACK request, the AP 20-1 transmits a block ACK (BA) frame to an STA 10-1 (step S418). Specifically, if the data processing unit 11 determines that a BAR is included in a UL frame, the control unit 17 causes the communication unit 12 to transmit a BA frame to an STA 10-1 that is a request sender. Note that when a BAR is included in a plurality of UL frames, the control unit 17 may cause the communication unit 12 to transmit a BA frame to each STA 10-1 that is a request sender using space-division multiplex communication or multicast communication, or to transmit a BA frame to one of STAs 10-1 that are a BAR sender. Alternatively, the control unit 17 may cause the communication unit 12 to transmit a BA frame to each of STAs 10-1 that are a BAR sender, in any order.

Thus, according to the first embodiment of the present disclosure, the STA 10-1 processes a frame so that the frame has redundancy corresponding to first information indicating a permitted transmission period. Therefore, a frame is processed so that the transmission period of the frame fits the permitted transmission period while improving the reliability of the frame. Therefore, effective use of wireless communication resources and stabilization of reception performance can be simultaneously achieved.

Also, the STA 10-1 adds a duplicate or duplicates of a first frame to be transmitted to the first frame within a range where the permitted transmission period is not exceeded. Therefore, the first frame becomes redundant, and therefore, the reliability of the first frame can be improved.

Also, a duplicate of the first frame includes at least one of a duplicate of the entire first frame and a duplicate of a portion of the first frame. Therefore, even when a duplicate of the entire first frame cannot be added, the reliability of a portion of the first frame can be improved.

When the transmission period of a frame is shorter than the permitted transmission period, the STA 10-1 adds a block ACK request to the first frame. Therefore, a BA frame can be received as a response to the first frame without transmitting a block ACK request separately, a waiting time until a BA frame is received can be reduced.

When the transmission period of the above processed frame is shorter than the permitted transmission period, the STA 10-1 adds a padding to the first frame. Therefore, even when the transmission period of the processed frame is shorter than the permitted transmission period, the transmission period of the processed frame is caused to be equal to the permitted transmission period. Therefore, the possibility that the reduction of reception performance in the AP 20-1 is prevented can be improved.

The STA 10-1 incorporates information related to the above process into a frame on which the process has been performed. Therefore, the AP 20-1 that receives such a frame can know that the process has been performed, and can appropriately process that frame, separately from normal frames.

The information related to the above process includes information indicating the configuration of a frame on which the process has been performed. Therefore, even when the configuration of a frame is dynamically changed, the AP 20-1 can appropriately perform a process, such as analysis or the like, on the frame.

The STA 10-1 receives the above first information from the AP 20-1, and transmits a frame on which the above process has been performed to the AP 20-1. Therefore, a process of causing a frame to be redundant can be performed, depending on a condition of a destination of the first information, and the redundancy process can be caused to be suitable.

The STA 10-1 generates information that can be used to specify the transmission period of the first frame to be transmitted, and transmits a transmission permission request frame including the generated information to the AP 20-1. Therefore, information that can be used in determining the permitted transmission period is provided to the AP 20-1 through existing communication, and therefore, the permitted transmission period can be caused to be suitable while the consumption of wireless communication resources is reduced.

The STA 10-1 receives, from the AP 20-1, a transmission permission frame including information involved in multiplexing of transmission of the first frame as a response to a transmission permission request frame, and based on the information involved in multiplexing, determines whether to perform the above process. Therefore, the information involved in multiplexing is provided to the STA 10-1 through existing communication, and therefore, multiplex communication can be performed while the consumption of wireless communication resources is reduced.

3. Second Embodiment (Example in which Modulation Scheme is Changed)

The communication system of the first embodiment of the present disclosure has been described above. Next, a communication system according to a second embodiment of the present disclosure will be described. An STA 10-2 according to this embodiment changes a frame modulation scheme instead of adding a duplicate frame.

<3-1. Functions of Communication Apparatus>

The STA 10-2 and an AP 20-2 have substantially the same functional configuration as that of the first embodiment, except for a portion of the functions of the communication unit 12 and the control unit 17. Note that substantially the same functions as those of the first embodiment will not be described.

((Functions of STA))

Firstly, functions of the STA 10-2 will be described. Note that only functions different from those of the first embodiment will be described.

(Function of Changing Transmission Period of UL Frame)

The communication unit 12 performs a modulation process on a frame to be transmitted using a modulation scheme having a lower order than those of other modulation schemes within a range where the permitted transmission period is not exceeded. Specifically, the control unit 17 selects a modulation scheme having a lower order than those of other modulation schemes within a range where the transmission period of a frame to be transmitted does not exceed the permitted transmission period, the frame being generated by the data processing unit 11. Thereafter, the control unit 17 causes the communication unit 12 to modulate and transmit the frame using the selected modulation scheme.

((Functions of AP))

Next, functions of the AP 20-2 will be described. Note that only functions different from those of the first embodiment will be described.

In accordance with the modulation scheme used in the STA 10-2, the communication unit 12 demodulates a frame that has been modulated using the modulation scheme. For example, the AP 20-2 may be previously notified of information related to the modulation scheme from the STA 10-2, or the information may be included in a header of a UL frame to be received. Note that, in the latter case, it is assumed that the UL frame header can be demodulated by the AP 20-2, and to achieve this, the UL frame header is modulated using a modulation scheme known to the AP 20-2, for example.

<3-2. Process of Communication Apparatus>

Next, a process of the STA 10-2 of this embodiment will be described. Note that a process of changing the transmission period of a UL frame, which is a different from the first embodiment, will be mainly described.

(Process of Changing Transmission Period of UL Frame)

The process of changing the transmission period of a UL frame in the STA 10-2 according to this embodiment will be described with reference to FIGS. 5 and 8. FIG. 8 is a flowchart showing the concept of the process of changing the transmission period of a UL frame in the STA 10-2 according to this embodiment. Note that substantially the same steps as those of the first embodiment will not be described.

Firstly, the STA 10-2 determines whether or not the difference D between the transmission period of a UL frame and the permitted transmission period is zero (step S502).

If the STA 10-2 determines that the difference D is not zero, the STA 10-2 selects a modulation scheme based on the difference D (step S504). Specifically, the control unit 17 selects, from selectable modulation schemes, one that causes the difference D to be zero or smaller than values that are obtained using other modulation schemes.

Next, the STA 10-2 determines whether or not the difference D that is updated using the transmission period of a UL frame that is estimated based on the selected modulation scheme is zero (step S506). If the STA 10-2 determines that the difference D is not zero, the STA 10-2 adds a padding to the UL frame (step S508). Specifically, the control unit 17 estimates the transmission period of a UL frame that will be obtained when the selected modulation scheme is used, and updates the difference D using the estimated transmission period. Thereafter, if the updated difference D is not zero or substantially zero, the data processing unit 11 adds a padding to the UL frame. In this case, the data processing unit 11 adds a padding to the UL frame so that the transmission period of the UL frame after modulation is equal to the permitted transmission period.

Thereafter, the STA 10-2 transmits the generated UL frame in step S216 shown in FIG. 5. Specifically, the control unit 17 causes the communication unit 12 to modulate and transmit a UL frame using the selected modulation scheme.

Thus, according to the second embodiment of the present disclosure, the STA 10-2 performs a modulation process on the first frame using a modulation scheme having a lower order than those of other modulation schemes within a range where the permitted transmission period is not exceeded. Typically, the lower the order of the modulation scheme, the longer the transmission period and the higher the resistance to interference. Therefore, according to this embodiment, the reliability of the first frame can be improved while the transmission period of the first frame is caused to be equal to the permitted transmission period.

Although, in the above-described flowchart shown in FIG. 8, an example has been described in which a modulation scheme is selected based on the difference D, a modulation scheme may be selected based on the permitted transmission period. Specifically, the control unit 17 selects, from selectable modulation schemes, one that causes the transmission period of a UL frame to be shorter than or equal to the permitted transmission period when that modulation scheme is selected. In this case, the STA 10-2 does not have to calculate the difference D when the difference D is not used in other processes, and therefore, the process of the STA 10-2 can be simplified.

<3-3. Variations>

The second embodiment of the present disclosure has been described above. Note that this embodiment is not limited to the above examples. Variations of this embodiment will now be described.

According to a variation of this embodiment, the STA 10-2 may change an error correction coding rate instead of changing a modulation scheme. Specifically, the data processing unit 11 reduces the error correction coding rate of a frame to be transmitted within a range where the permitted transmission period is not exceeded. Moreover, a process of this embodiment will be described with reference to FIGS. 5 and 8.

Initially, as shown in FIG. 8, the STA 10-2 determines whether or not the difference D between the transmission period of a UL frame and the permitted transmission period is zero (step S502). If the STA 10-2 determines that the difference D is not zero, the STA 10-2 selects an error correction coding rate based on the difference D (a step corresponding to step S504). Specifically, the control unit 17 selects, from selectable error correction coding rates, one that causes the difference D to be zero, or smaller than when other coding rates are used, when that coding rate is used.

Next, the STA 10-2 determines whether or not the difference D is zero (step S506). If the STA 10-2 determines that the difference D is not zero, the STA 10-2 adds a padding to the UL frame (step S508). Specifically, the control unit 17 estimates the transmission period of a UL frame that will be obtained when a selected error correction coding rate is used, and updates the difference D using the estimated transmission period. Thereafter, if the updated difference D is not zero or substantially zero, the data processing unit 11 adds a padding to the UL frame. In this case, the data processing unit 11 adds a padding so that the transmission period of the UL frame after error correction coding is equal to the permitted transmission period.

Thereafter, as shown in FIG. 5, the STA 10-2 transmits the generated UL frame (step S216). Specifically, the control unit 17 causes the communication unit 12 to modulate and transmit the UL frame using the selected error correction coding rate.

Thus, according to the variation of this embodiment, the STA 10-2 reduces the error correction coding rate of a frame to be transmitted within a range where the permitted transmission period is not exceeded. Typically, the lower the error correction coding rate, the longer the transmission period and the higher the resistance to interference. Therefore, according to this embodiment, the reliability of the first frame can be improved while the transmission period of the first frame is caused to be equal to the permitted transmission period.

Note that the combinations of a modulation scheme and an error correction coding rate may have a relationship in which one of the modulation scheme and the error correction coding rate is determined based on the other. In this case, the control unit 17 may estimate the transmission period of a UL frame that will be obtained when each of the combinations is used, and may select, from the combinations, one that causes the estimated transmission period to be shorter than or equal to the permitted transmission period.

4. Third Embodiment (Example Application to Communication of Base Station)

The communication system according to the second embodiment of the present disclosure has been described. Next, a communication system according to a third embodiment of the present disclosure will be described. An AP 20-3 according to this embodiment, when a DL frame is multiplexed, performs a redundancy process, modulation process, or the like that is similar to that performed by the STA 10-1 or 10-2 according to the first or second embodiment.

<4-1. Functions of Communication Apparatus>

An STA 10-3 and the AP 20-3 have substantially the same functional configuration as that of the first embodiment, except for a portion of the functions of the data processing unit 11, the communication unit 12, and the control unit 17 of the AP 20-3. However, the different functions are substantially the same as those of the STA 10 of the first or second embodiment, and therefore, will be briefly described in the description of a process.

<4-2. Process of Communication Apparatus>

A process of the AP 20-3 according to this embodiment will be described with reference to FIGS. 9 and 10. Firstly, a flow of a process of a communication system will be described with reference to FIG. 9. FIG. 9 is a sequence diagram showing the concept of the communication system of this embodiment.

Initially, the AP 20-3 generates a frame to be transmitted as a DL frame (step S602). Specifically, the data processing unit 11 generates a frame based on data for each of STAs 10-3A and 10-3B as a DL frame.

Next, the AP 20-3 determines whether to change the transmission period of the DL frame (step S604), and performs a process of changing the transmission period of the DL frame (step S606). Thereafter, the AP 20-3 transmits the DL frame (step S608). This will be described in detail below. Although not shown, the STA 10-3A and 10-3B, when receiving the DL frame, may transmit an acknowledgement response to the DL frame, to the AP 20-3.

Next, a DL frame transmission process (steps S604 to S608) in the AP 20-3 will be described in detail with reference to FIG. 10. FIG. 10 is a flowchart showing the concept of the DL frame transmission process in the AP 20-3 according to this embodiment.

Initially, the AP 20-3 determines whether or not there are frames to be multiplexed together (step S702). Specifically, the control unit 17 determines whether or not there are frames having overlapping transmission periods, by referencing the destination of frames stored in a transmission buffer. Note that the control unit 17 may determine whether or not there are frames that can be transmitted during the same transmission period. For example, the control unit 17 may determine whether or not there are a plurality of frames toward the STA 10-3 that belong to the same group as described above.

If the AP 20-3 determines that there are frames to be multiplexed together, the AP 20-3 determines whether or not the frames to be multiplexed together have equal transmission periods (step S704). Specifically, the control unit 17 calculates the transmission period of each of the frames to be multiplexed together, and determines whether or not the calculated transmission periods are equal to each other.

If the AP 20-3 determines that the frames to be multiplexed together have different transmission periods, the AP 20-3 performs a process of changing the transmission period of a DL frame (step S706), and incorporates information related to changing the transmission period into a header of the DL frame (step S708). Specifically, if the control unit 17 determines that the transmission periods of the frames to be multiplexed together are not equal to each other, the data processing unit 11 performs the process of changing the transmission period of a DL frame. Thereafter, the data processing unit 11 incorporates transmission period change information into a header of the processed DL frame. Note that the permitted transmission period may be previously stored, obtained, or calculated by the AP 20-3. The process of changing the transmission period of a DL frame and the process of including the transmission period change information are substantially the same as the UL frame processes of the first or second embodiment, and therefore, will not be described.

Next, the AP 20-3 transmits a DL frame (step S710). Specifically, the AP 20-3 performs a space-division multiplexing process on each DL frame, and transmits the processed DL frame to each STA 10-1 that is a destination.

Thus, according to the third embodiment of the present disclosure, the AP 20-3 processes a frame so that the frame has redundancy or using a modulation scheme, based on first information indicating the permitted transmission period. Therefore, the reliability of a frame transmitted by the AP 20-3 can be improved, and wireless communication resources can be effectively used.

5. Fourth Embodiment (Example in which Frequency-Division Multiplex Communication is Used)

The communication system according to the third embodiment of the present disclosure has been described above. Next, a communication system according to a fourth embodiment of the present disclosure will be described. An STA 10-4 and an AP 20-4 according to this embodiment perform communication a frequency-division multiplexing scheme and a time-division multiplexing scheme instead of a space-division multiplexing scheme.

<5-1. Functions of Communication Apparatus>

The STA 10-4 and the AP 20-4 have substantially the same functional configuration as that of the first embodiment, except for a portion of the functions of the data processing unit 11, the communication unit 12, and the control unit 17. Note that substantially the same functions as those of the first to third embodiments will not be described.

((Basic Functions))

The modulation/demodulation unit 13 and the signal processing unit 14 in the communication unit 12 perform a process involved in frequency-division multiplexing. Specifically, the modulation/demodulation unit 13 divides a frame provided from the data processing unit 11 into portions, the number of which is equal to the number of subcarriers, and modulates each portion of the frame obtained by the division. Thereafter, the modulation/demodulation unit 13 combines signals obtained by the modulation, and provides the signal obtained by the combination to the signal processing unit 14. The signal processing unit 14 performs a process, such as addition of a guard interval, or the like, on the signal provided from the modulation/demodulation unit 13, and provides a signal obtained by the process, i.e., a symbol stream, to the radio interface unit 16.

The signal processing unit 14 performs a process, such as removal of a guard interval, or the like, on the symbol stream related to received waves provided from the radio interface unit 16, and provides a signal obtained by the process to the modulation/demodulation unit 13. The modulation/demodulation unit 13 extracts a subcarrier signal from the signal provided from the signal processing unit 14, and demodulates each subcarrier. Thereafter, the modulation/demodulation unit 13 combines frames obtained by the demodulation, and provides the combined frame to the data processing unit 11.

((Functions of STA))

Next, functions of the STA 10-4 will be described.

(Function of Obtaining Information Involved in Multiplexing)

The control unit 17 obtains information involved in frequency-division multiplexing and time-division multiplexing from the AP 20-4 using a frame exchange process between the STA 10-4 and the AP 20-4 that is involved in transmission permission. For example, the control unit 17 obtains information involved in frequency-division multiplexing and time-division multiplexing from a transmission permission frame received as a response to a transmission permission request frame that the control unit 17 causes the communication unit 12 to transmit.

(Function of Changing Resources Used for UL Frame)

The data processing unit 11 processes a frame so that the frame has redundancy corresponding to a resource block. Specifically, the data processing unit 11 adds a duplicate of a frame to be transmitted, a subframe of the frame, a BAR, and/or a padding to a UL frame so that a resource block specified by the control unit 17 is completely consumed.

The control unit 17 specifies a resource block based on information involved in multiplexing contained in a transmission permission frame. Specifically, information involved in frequency-division multiplexing and time-division multiplexing is at least one of information indicating a transmission period, information indicating a subcarrier that is a band used for transmission, information indicating a resource block, and information that can be used to specify an STA 10-4 permitted to perform communication. For example, if the information involved in multiplexing is information indicating a transmission period or a subcarrier, the control unit 17 specifies a resource block based on that transmission period or subcarrier, and a subcarrier or transmission period that is previously obtained or previously stored in an STA 10-4.

((Functions of AP))

Next, functions of the AP 20-4 will be described.

(Function of Providing Information Involved in Multiplexing)

The control unit 17 generates information involved in frequency-division multiplexing and time-division multiplexing. Specifically, the control unit 17 specifies individual STAs 10-4 permitted to perform frequency-division multiplex communication and time-division multiplex communication, and allocates a resource block to each specified STA 10-4. The process of allocating a resource block will be described in detail with reference to FIG. 11. FIG. 11 is a diagram showing an example of the resource block allocation in this embodiment.

Initially, the control unit 17 specifies individual STAs 10-4 permitted to perform frequency-division multiplex communication and time-division multiplex communication. For example, the control unit 17 specifies individual STAs 10-4 that are a destination of a received transmission permission request frame, as that which is permitted.

Next, the control unit 17 allocates a resource block to each specified STA 10-4. For example, as shown in FIG. 11, the control unit 17 allocates resource blocks 32 to 36 to three respective STAs 10-4.

Thereafter, the control unit 17 generates information involved in frequency-division multiplexing and time-division multiplexing, and causes the communication unit 12 to transmit a UL frame including the information. For example, the control unit 17 generates information indicating allocation of a resource block, causes the data processing unit 11 to generate a transmission permission frame including the information, and causes the communication unit 12 to transmit the transmission permission frame.

<5-2. Process of Communication Apparatus>

A process of the information system according to this embodiment is substantially the same as that of the first embodiment, except that frequency-division multiplex communication and time-division multiplex communication are performed instead of space-division multiplex communication, and that the transmission period of a frame is changed and modulated according to at least one of a permitted transmission period and a subcarrier instead of that the transmission period of a frame is changed according to a permitted transmission period, and therefore, will not be described. Although, in FIG. 5, the process is branched, depending on the presence or absence of a frame to be multiplexed, in this embodiment a process corresponding to steps S210 to S214 is performed irrespective of the presence or absence of a frame to be multiplexed so that an allocated resource block is completely consumed.

Thus, according to the fourth embodiment of the present disclosure, the STA 10-4 processes a frame so that the frame has redundancy corresponding to information indicating at least one of a permitted transmission period and a subcarrier. Therefore, also in frequency-division multiplex communication and time-division multiplex communication, the reliability of a frame can be improved.

Although an example has been described above in which frequency-division multiplex communication and time-division multiplex communication are performed, only one of frequency-division multiplex communication and time-division multiplex communication may be performed.

Although an example has been described above in which a duplicate frame or the like is added to a UL frame as in the first embodiment, a frame may be processed using a modulation scheme or error correction coding rate corresponding to a permitted transmission period or subcarrier as in the second embodiment.

Although the process of a UL frame has been described, a DL frame may be processed in a similar fashion.

6. Application Example

The technology according to the embodiments of the disclosure can be applied to various products. For example, the STA 10 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the STA 10 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the STA 10 may be wireless communication modules mounted in such terminals (for example, integrated circuit modules configured by one die).

On the other hand, for example, the AP 20 may be realized as a wireless LAN access point (also referred to as a wireless base station) which has a router function or does not have a router function. The AP 20 may be realized as a mobile wireless LAN router. The AP 20 may also be a wireless communication module (for example, an integrated circuit module configured with one die) mounted on the device.

6-1. First Application Example

FIG. 12 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 12. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 12 via power supply lines partially indicated by dashed lines in the drawing. The auxiliary controller 919 causes, for example, necessary minimum functions of the smartphone 900 to be operated in a sleep mode.

In the smartphone 900 shown in FIG. 12, the data processing unit 11, the communication unit 12, and the control unit 17 described with reference to FIG. 2 may be mounted in the wireless communication interface 913. At least some of the functions may be mounted on the processor 901 or the auxiliary controller 919. For example, if the data processing unit 11 adds a duplicate frame to a transmission frame, the redundancy of the transmission frame is enhanced, and therefore, the reliability of the transmission frame can be improved.

Note that the smartphone 900 may operate as a wireless access point (software AP) as the processor 901 executes the function of an access point at an application level. In addition, the wireless communication interface 913 may have the function of a wireless access point.

6-2. Second Application Example

FIG. 13 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 13. In this case, the antenna switch 934 may be omitted from the configuration of the car navigation device 920.

The battery 938 supplies electric power to each of the blocks of the car navigation device 920 shown in FIG. 13 via power supply lines partially indicated by dashed lines in the drawing. In addition, the battery 938 accumulates electric power supplied from the vehicle.

In the car navigation device 920 shown in FIG. 13, the data processing unit 11, the communication unit 12, and the control unit 17 described with reference to FIG. 2 may be mounted in the wireless communication interface 933. At least some of the functions may be mounted on the processor 921. For example, if the data processing unit 11 adds a duplicate frame to a transmission frame, the redundancy of the transmission frame is enhanced, and therefore, the reliability of the transmission frame can be improved.

The wireless communication interface 933 may operate as the above-described AP 20 to supply wireless connection to a terminal owned by a user boarding a vehicle. In this case, for example, when there are a plurality of such terminals, the AP 20 can cause frames to be transmitted to the terminals to have equal transmission periods while improving the reliability of the frames.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

6-3. Third Application Example

FIG. 14 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 shown in FIG. 14, the data processing unit 11, the communication unit 12, and the control unit 17 described with reference to FIG. 2 may be mounted on the wireless communication interface 963. At least some of the functions may be mounted on the processor 951. For example, if the data processing unit 11 adds a duplicate frame to a transmission frame, the redundancy of the transmission frame is enhanced, and therefore, the reliability of the transmission frame can be improved.

7. Conclusion

Thus, according to the first embodiment of the present disclosure, a frame is processed so that the transmission period of the frame fits a permitted transmission period while the reliability of the frame is improved, and therefore, effective use of wireless communication resources and stabilization of reception performance can be simultaneously achieved. Also, according to the second embodiment of the present disclosure, the reliability of a first frame can be improved while the transmission period of the first frame is caused to be equal to a permitted transmission period. Also, according to the third embodiment of the present disclosure, the reliability of a frame transmitted by the AP 20-3 can be improved, and wireless communication resources can be effectively used. Also, according to the fourth embodiment of the present disclosure, even in frequency-division multiplex communication, effective use of wireless communication resources and stabilization of reception performance can be simultaneously achieved.

It should be understood by those skilled in the art that various modifications, combinations, sub-combinations and alterations may occur depending on design requirements and other factors insofar as they are within the scope of the appended claims or the equivalents thereof.

Although, for example, in the above embodiments, the transmission period of a frame is changed within a range where a permitted transmission period is not exceeded, the present technology is not limited to those examples. For example, the transmission period of a frame may be changed to a transmission period within an acceptable range, when the influence on the reception performance of a destination falls within an acceptable range.

Also, the configurations of the above embodiments may be combined as long as such combination is compatible. For example, the configurations of the STA 10 according to the first, second, and fourth embodiments are applicable to the configurations of the AP 20 of the third embodiment.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication apparatus including:

a processing unit configured to process a frame in a manner that the frame has redundancy corresponding to first information indicating at least one of a first transmission period or a band used for transmission, or using a modulation scheme corresponding to the first information.

(2)

The communication apparatus according to (1), wherein the processing unit adds a duplicate of a first frame to be transmitted to the first frame within a range where the first transmission period is not exceeded.

(3)

The communication apparatus according to (2), wherein the duplicate of the first frame includes at least one of a duplicate of the entire first frame or a duplicate of a portion of the first frame.

(4)

The communication apparatus according to (1), wherein the processing unit reduces an error correction coding rate of a first frame to be transmitted within a range where the first transmission period is not exceeded.

(5)

The communication apparatus according to (1), wherein the processing unit performs a modulation process on a first frame to be transmitted, using a modulation scheme having an order lower than an order of another modulation scheme, within a range where the first transmission period is not exceeded.

(6)

The communication apparatus according to any one of (1) to (5), wherein when a frame has a transmission period shorter than the first transmission period, the processing unit adds a block delivery acknowledgement request to a first frame to be transmitted.

(7)

The communication apparatus according to any one of (2) to (6), wherein when the processed frame has a transmission period shorter than the first transmission period, the processing unit adds a padding to the first frame.

(8)

The communication apparatus according to any one of (1) to (7), wherein the processing unit incorporates information related to the process into the processed frame.

(9)

The communication apparatus according to (8), wherein the information related to the process includes information indicating a configuration of the processed frame.

(10)

The communication apparatus according to any one of (1) to (9), further including:

a communication unit configured to receive the first information from a second communication apparatus, wherein the communication unit transmits the processed frame to the second communication apparatus.

(11)

The communication apparatus according to (10), wherein the processing unit generates information that is used to specify a transmission period of a first frame to be transmitted, and wherein the communication unit transmits a transmission permission request frame including the generated information that is used to specify the transmission period, to the second communication apparatus.

(12)

The communication apparatus according to (11), wherein the communication unit receives a transmission permission frame including information involved in multiplexing of transmission of the first frame, as a response to the transmission permission request frame, from the second communication apparatus, and wherein the processing unit determines whether to perform the process based on the information involved in multiplexing.

(13)

The communication apparatus according to (12), wherein the information involved in multiplexing includes at least one of information indicating the first transmission period, information used in calculating the first transmission period, or information that is used to specify a communication apparatus allowed to perform transmission during the first transmission period.

(14)

The communication apparatus according to (13), wherein the processed frame is space-division multiplexed with the processed frame transmitted from a third communication apparatus.

(15)

The communication apparatus according to (14), wherein, as the communication apparatus allowed to perform transmission, there is selected a communication apparatus having a lower correlation with a channel gain of the communication apparatus transmitting the transmission permission request frame than a correlation of another communication apparatus.

(16)

The communication apparatus according to (13), wherein the information that is used to specify a communication apparatus allowed to perform transmission includes information indicating a group of communication apparatuses that are a destination of the transmission permission frame.

(17)

The communication apparatus according to (13), wherein the processed frame is multiplexed with the processed frame transmitted from a third communication apparatus using at least one of frequency-division multiplexing or time-division multiplexing.

(18)

A communication method including:

processing a frame in a manner that the frame has redundancy corresponding to first information indicating at least one of a first transmission period or a band used for transmission, or using a modulation scheme corresponding to the first information.

(19)

A communication system including:

a function of processing a frame in a manner that the frame has redundancy corresponding to first information indicating at least one of a first transmission period or a band used for transmission, or using a modulation scheme corresponding to the first information.

(20)

A program causing a computer to execute:

a function of processing a frame in a manner that the frame has redundancy corresponding to first information indicating at least one of a first transmission period or a band used for transmission, or using a modulation scheme corresponding to the first information.

(21)

A communication apparatus including:

circuitry configured to perform a process on a frame so that the frame has redundancy corresponding to first information indicating at least one of a first transmission period or a band used for transmission, or uses a modulation scheme corresponding to the first information.

(22)

The communication apparatus according to (21), wherein the circuitry is further configured to add a duplicate of at least portion of a first frame to the first frame within the first transmission period.

(23)
The communication apparatus according to (22),
wherein the duplicate of the first frame includes a duplicate of the entire first frame.

(24)
The communication apparatus according to any one of (21) to (23),
wherein the circuitry is further configured to change an error correction coding rate of a first frame within the first transmission period, or to perform a modulation process on the first frame, using a modulation scheme having an order different than an order of another modulation scheme, within the first transmission period.

(25)
The communication apparatus according to (24), wherein the circuitry is further configured to change the error correction coding rate by reducing the error correction rate.

(26)
The communication apparatus according to (24) or (25),
wherein the circuitry is further configured to perform the modulation process on the first frame, by using a modulation scheme having an order lower than the order of another modulation scheme, within the first transmission period.

(27)
The communication apparatus according to any one of (21) to (26),
wherein when a frame has a transmission period shorter than the first transmission period, the circuitry is further configured to add a block delivery acknowledgement request to a first frame.

(28)
The communication apparatus according to (22),
wherein when the processed frame has a transmission period shorter than the first transmission period, the circuitry is further configured to add a padding to the first frame.

(29)
The communication apparatus according to any one of (21) to (28),
wherein the circuitry is further configured to incorporate information related to the process into the frame that is processed.

(30)
The communication apparatus according to (29),
wherein the information related to the process includes information indicating a configuration of the frame that is processed.

(31)
The communication apparatus according to any one of (21) to (30), wherein the circuitry is further configured to receive the first information from a second communication apparatus, and transmit the frame that is processed to the second communication apparatus.

(32)
The communication apparatus according to (31), wherein the circuitry is further configured to generate information that is used to specify a transmission period of a first frame, and transmit a transmission permission request frame including the generated information that is used to specify the transmission period, to the second communication apparatus.

(33)
The communication apparatus according to (32), wherein the circuitry is further configured to receive a transmission permission frame including information related to multiplexing of transmission of the first frame, as a response to the transmission permission request frame, from the second communication apparatus, and determine whether to perform the process based on the information related to multiplexing.

(34)
The communication apparatus according (33),
wherein the information related to multiplexing includes at least one of information indicating the first transmission period, information used in calculating the first transmission period, or information that is used to specify a communication apparatus allowed to perform transmission during the first transmission period.

(35)
The communication apparatus according to (34),
wherein the frame that is processed is space-division multiplexed with a frame that is processed and transmitted from a third communication apparatus.

(36)
The communication apparatus according to (35),
wherein, as the communication apparatus allowed to perform transmission, there is selected a communication apparatus having a lower correlation with a channel gain of the communication apparatus transmitting the transmission permission request frame than a correlation of another communication apparatus.

(37)
The communication apparatus according to (34),
wherein the information that is used to specify a communication apparatus allowed to perform transmission includes information indicating a group of communication apparatuses that are a destination of the transmission permission frame.

(38)
The communication apparatus according to (34) or (37),
wherein the frame that is processed is multiplexed with a frame that is processed and transmitted from a third communication apparatus using at least one of frequency-division multiplexing or time-division multiplexing.

(39)
A communication method including:
performing a process, with circuitry, on a frame so that the frame has redundancy corresponding to first information indicating at least one of a first transmission period or a band used for transmission, or uses a modulation scheme corresponding to the first information.

(40)
A non-transitory computer-readable medium encoded with computer-readable instructions that, when executed by circuitry, cause the circuitry to perform a method including:
performing a process on a frame so that the frame has redundancy corresponding to first information indicating at least one of a first transmission period or a band used for transmission, or uses a modulation scheme corresponding to the first information.

REFERENCE SIGNS LIST

10 STA
11 data processing unit
12 communication unit
13 modulation/demodulation unit
14 signal processing unit
15 channel estimation unit
16 radio interface unit
17 control unit
20 AP

The invention claimed is:

1. A communication apparatus comprising:
a radio interface configured to receive a wireless receive signal containing
first information indicating an allocated resource block for transmission by the radio interface, the first information defining a time period or frequency band allocated to the communication apparatus to transmit a wireless transmit signal to another device;
circuitry configured to
generate a frame that includes data and a duplicate of at least a portion of the data so the frame fits the time period or the frequency band defined by the first information, and the frame includes data redundancy as to enhance and stabilize reception performance, or
generate an encoded frame with data and a duplicate of at least a portion of the data so the encoded frame has data redundancy and the encoded frame fits the time period or the frequency band defined by the first information, wherein
the radio interface is further configured to transmit to the another device the frame or encoded frame within the time period or the frequency band allocated to the communication apparatus.

2. The communication apparatus according to claim 1, wherein the duplicate data includes a duplicate of the entire data to be transmitted by the communication apparatus.

3. The communication apparatus according to claim 1, wherein the circuitry is further configured to select a coding scheme by
selecting an error correction coding rate to be applied to the frame that causes the encoded frame to fit the time period or the frequency band defined by the first information, or
selecting a modulation scheme having an order that causes the modulated frame to fit the time period or the frequency band defined by the first information.

4. The communication apparatus according to claim 3, wherein the selected error correction coding rate is low enough to cause data of the frame to fit the time period or the frequency band defined by the first information.

5. The communication apparatus according to claim 3, wherein the order of the selected modulation scheme is low enough to cause data of the frame to fit the time period or the frequency band defined by the first information.

6. The communication apparatus according to claim 1, wherein the circuitry is further configured to add a block delivery acknowledgement request to the frame or encoded frame.

7. The communication apparatus according to claim 1, wherein when the frame or encoded frame has a transmission period shorter than the time period defined by the first information, the circuitry is further configured to add a padding to the frame or encoded frame.

8. The communication apparatus according to claim 1, wherein the circuitry is further configured to add to the frame or encoded frame information related to the generation of the frame or encoded frame by the circuitry.

9. The communication apparatus according to claim 8, wherein the information related to the generation of the frame or encoded frame includes information indicating a configuration of the frame or encoded frame.

10. The communication apparatus according to claim 1, wherein the circuitry is further configured to generate a transmission permission request frame specifying a transmission period of a first frame, and
transmit the transmission permission request frame specifying the transmission period, to the another device.

11. The communication apparatus according to claim 10, wherein the circuitry is further configured to
receive a transmission permission frame including information related to multiplexing of transmission of the first frame, as a response to the transmission permission request frame, from the second communication apparatus, and
determine whether to generate the frame or encoded frame based on the information related to multiplexing.

12. The communication apparatus according to claim 11, wherein the information related to multiplexing includes at least one of information indicating the time period of the first information, information used in calculating the time period of the first information, or information that is used to specify a communication apparatus allowed to perform transmission during the time period of the first information.

13. The communication apparatus according to claim 12, wherein the frame or encoded frame is space-division multiplexed with a frame that is transmitted from another communication apparatus.

14. The communication apparatus according to claim 13, wherein, as the communication apparatus allowed to perform transmission, a communication apparatus is selected based on correlation with a channel gain of the communication apparatus transmitting the transmission permission request frame.

15. The communication apparatus according to claim 12, wherein the information that is used to specify the communication apparatus allowed to perform transmission includes information indicating a group of communication apparatuses that are a destination of the transmission permission frame.

16. The communication apparatus according to claim 12, wherein the frame or encoded frame is multiplexed with a frame that is transmitted from a third communication apparatus using at least one of frequency-division multiplexing or time-division multiplexing.

17. A communication method comprising:
receiving via a radio interface a wireless receive signal including first information indicating an allocated resource block for transmission by the radio interface, to transmit a wireless transmit signal to another device;
generating with circuitry a frame that includes data by
also adding a duplicate of at least a portion of the data so the frame fits the time period or the frequency band defined by the first information, and the frame includes data redundancy as to enhance and stabilize reception performance, or
also adding a duplicate of at least a portion of the data and selecting and applying a coding scheme to encode the frame such that the encoded frame fits the time period or the frequency band defined by the first information; and
transmitting to the another device the generated frame within the time period or the frequency band allocated to the communication apparatus.

18. A non-transitory computer-readable medium encoded with computer-readable instructions that, when executed by circuitry, cause the circuitry to perform a method comprising:
receiving via a radio interface a wireless receive signal including first information indicating an allocated resource block for transmission by the radio interface, to transmit a wireless transmit signal to another device;

generating with circuitry a frame that includes data by
- also adding a duplicate of at least a portion of the data so the frame fits the time period or the frequency band defined by the first information, and the frame includes data redundancy as to enhance and stabilize reception performance, or
- also adding a duplicate of at least a portion of the data and selecting and applying a coding scheme to encode the frame such that the encoded frame fits the time period or the frequency band defined by the first information; and transmitting to the another device the generated frame within the time period or the frequency band allocated to the communication apparatus.

* * * * *